US012059953B2

(12) United States Patent  (10) Patent No.: US 12,059,953 B2
Embler et al.  (45) Date of Patent: Aug. 13, 2024

(54) COMPOSITE TANKS FOR REUSABLE LAUNCH VEHICLES AND METHODS OF FABRICATING THEREOF

(71) Applicant: The Boeing Company, Chicago, IL (US)

(72) Inventors: Jonathan David Embler, Santa Ana, CA (US); John Matthew Nichols, Madison, AL (US); Glenn William Torres, Madison, AL (US); Jacob Ryan Szczudlak, Madison, AL (US); William Preston Keith, Lakewood, CA (US); Tin Anh Luu, Garden Grove, CA (US); Morgan Ashley Lewis, Huntington Beach, CA (US); Keith Charles Kreutztrager, St. Charles, MO (US); Jonathan Edward Toomey, Orange, CA (US); Juan Carlos Guzman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 76 days.

(21) Appl. No.: 17/405,509

(22) Filed: Aug. 18, 2021

(65) Prior Publication Data

US 2022/0258600 A1  Aug. 18, 2022

Related U.S. Application Data

(60) Provisional application No. 63/150,352, filed on Feb. 17, 2021.

(51) Int. Cl.
*F17C 1/04* (2006.01)
*B60K 15/077* (2006.01)
*B60K 15/03* (2006.01)

(52) U.S. Cl.
CPC .. *B60K 15/077* (2013.01); *B60K 2015/03486* (2013.01); *B60K 2015/0777* (2013.01)

(58) Field of Classification Search
CPC .......... B60K 2015/0777; B60K 15/077; B60K 2015/03486; B60K 2015/0775;
(Continued)

(56) References Cited

U.S. PATENT DOCUMENTS 3,508,578 A    4/1970  Stephens et al.
3,979,005 A *  9/1976  Robinson ............... B64D 37/06
                                              220/560.07
(Continued)

FOREIGN PATENT DOCUMENTS

DE      1243054 B    6/1967
KR   102182478 B1   11/2020

OTHER PUBLICATIONS

Extended European Search Report, EP Application No. 22157057.5-1004, dated Jun. 30, 2022, 5 pages.

*Primary Examiner* — Stephen J Castellano
(74) *Attorney, Agent, or Firm* — Kwan & Olynick LLP

(57) ABSTRACT

A composite tank for a reusable launch vehicle comprises a composite wall, having a first coefficient of thermal expansion. The composite wall comprises a first end, a second end, a central axis, which passes through the first end and through the second end, and a cylindrical interior surface. The composite tank also comprises slosh baffles, formed from a second material, having a second coefficient of thermal expansion that is different from the first coefficient of thermal expansion. Each of the slosh baffles is attached to the cylindrical interior surface of the composite wall. Each of the slosh baffles is annular and is separated from the cylindrical interior surface of the composite wall by a radial gap, selected, in part, based on a difference between the first coefficient of thermal expansion and the second coefficient
(Continued)

of thermal expansion. The radial gap is configured to change responsive to changes in temperature of the composite tank.

20 Claims, 18 Drawing Sheets

(58) Field of Classification Search
CPC .. B60K 2015/03111; B60K 2015/0344; B60K 2015/03473; F17C 2270/0197; F17C 2260/016
USPC ......................................................... 220/563
See application file for complete search history.

(56) References Cited

U.S. PATENT DOCUMENTS

| | | |
|---|---|---|
| 6,220,287 B1 | 4/2001 | Wolf |
| 6,571,624 B1 | 6/2003 | Grayson et al. |
| 2005/0180677 A1* | 8/2005 | Andrews .............. G01M 11/085 385/13 |

* cited by examiner

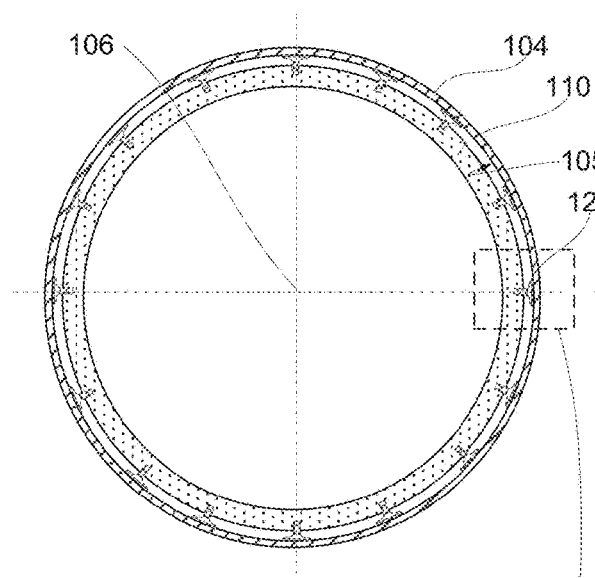
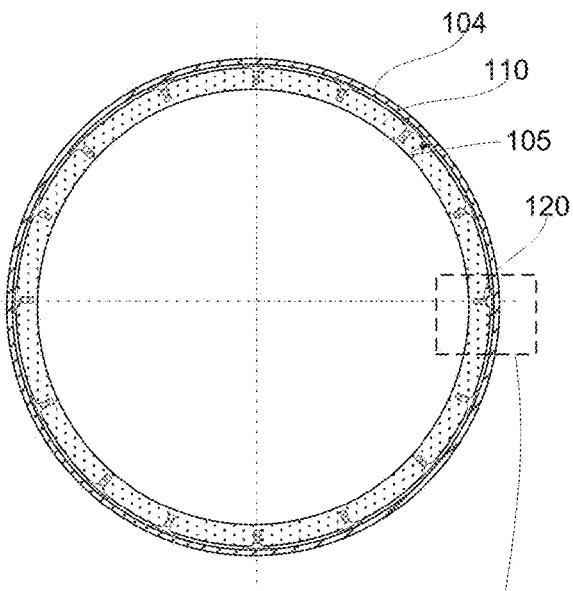
FIG. 3A  FIG. 3B
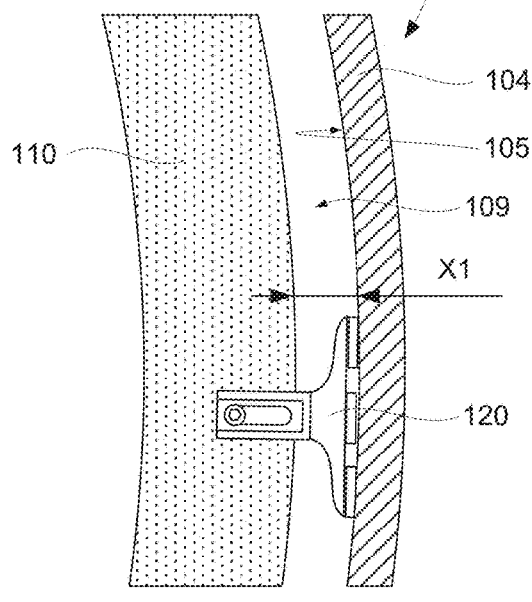
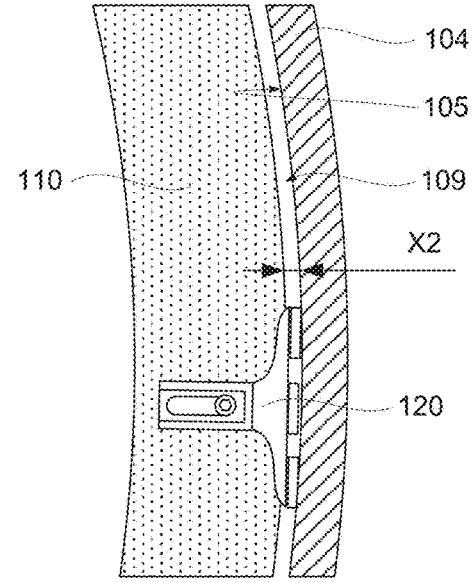
FIG. 3C  FIG. 3D

COMPOSITE TANKS FOR REUSABLE LAUNCH VEHICLES AND METHODS OF FABRICATING THEREOF

CROSS-REFERENCE TO RELATED APPLICATIONS

This application claims the benefit under 35 U.S.C. § 119(e) of U.S. Provisional Patent Application 63/150,352, filed on 2021 Feb. 17, which is incorporated herein by reference in its entirety for all purposes.

GOVERNMENT LICENSE RIGHTS

This invention was made with government support under HR0011-17-9-0001 awarded by Defense Advanced Research Projects Agency. The government has certain rights in this invention.

BACKGROUND

Slosh baffles are used in propellant tanks of launch vehicles for damping the propellant slosh. Propellant slosh is highly undesirable and may cause various disturbances of the launch vehicle operations, such as vehicle stability. Specifically, slosh baffles are positioned inside a propellant tank, typically connected to the interior tank walls and protruding away from these walls. These baffles at least partially block the movement of propellant inside the tank (e.g., proximate to the walls), thus reducing the overall mass oscillation of the tank. Generally speaking, the slosh baffles interact with the propellant flow and transfer kinetic energy of the propellant to the tank wall.

Propellant tanks generally undergo significant temperature fluctuations, e.g., between cryogenic temperatures (e.g., below −250° C.) and elevated temperatures, created by exhaust gases, diverted into the tank (e.g., above 300° C.). These temperature fluctuations cause significant contraction and expansion of various tank components, especially components, formed from materials with large coefficients of thermal expansion. Maintaining the connection between various tank components with different coefficients of thermal expansion can be challenging through such large temperature ranges.

For example, composite propellant tanks, such as laminated and/or wound composite tanks, are being considered for various launch vehicle applications. Composite tanks tend to have low weight and cost in comparison, for example, to conventional metal tanks. However, attaching slosh baffles to the interior walls of composite tanks can be challenging.

SUMMARY

Accordingly, apparatuses and methods, intended to address at least the above-identified concerns, would find utility.

The following is a non-exhaustive list of examples of the subject matter, disclosed herein.

Disclosed herein is a composite tank for a reusable launch vehicle. The composite tank comprises a composite wall, having a first coefficient of thermal expansion. The composite wall comprises a first end, a second end, a central axis, which passes through the first end and through the second end, and a cylindrical interior surface. The composite tank also comprises slosh baffles, formed from a second material, having a second coefficient of thermal expansion that is different from the first coefficient of thermal expansion. Each of the slosh baffles is attached to the cylindrical interior surface of the composite wall. Each of the slosh baffles is annular and is separated from the cylindrical interior surface of the composite wall by a radial gap, selected, in part, based on a difference between the first coefficient of thermal expansion and the second coefficient of thermal expansion. The radial gap is configured to change responsive to changes in temperature of the composite tank.

When the slosh baffles and the composite wall go through the temperature changes (e.g., between −250° C. and 315° C.), the slosh baffles and the composite wall can experience different size changes due to the difference in their coefficients of thermal expansion. For example, the slosh baffles can be formed from a metal and have a higher coefficient of thermal expansion than the composite wall. The radial gap and the connection between the slosh baffles and the composite wall can accommodate these different size changes without compromising the connection. The connection enables the slosh baffles to move relative to the composite wall while maintaining the ability to transfer the load from the moving propellant (inside the composite tank) to the composite walls. This connection and the load transfer feature is maintained over the entire operating temperature range. The radial gap is based on the difference between the first coefficient of thermal expansion of the composite wall and the second coefficient of thermal expansion of the slosh baffles.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIGS. 3A and 3B are schematic, top cross-sectional views of the composite tank of FIG. 1, illustrating the slosh baffles inside the composite tank at different operating temperatures, according to one or more examples of the subject matter, disclosed herein;

FIG. 3C is a schematic, expanded view of the composite tank of FIG. 1, illustrating the position of a slosh baffle relative to the composite wall in FIG. 3A, according to one or more examples of the subject matter, disclosed herein;

FIG. 3D is a schematic, expanded view of the composite tank of FIG. 1, illustrating the position of a slosh baffle relative to the composite wall in FIG. 3B, according to one or more examples of the subject matter, disclosed herein;

DETAILED DESCRIPTION

Figure 1:
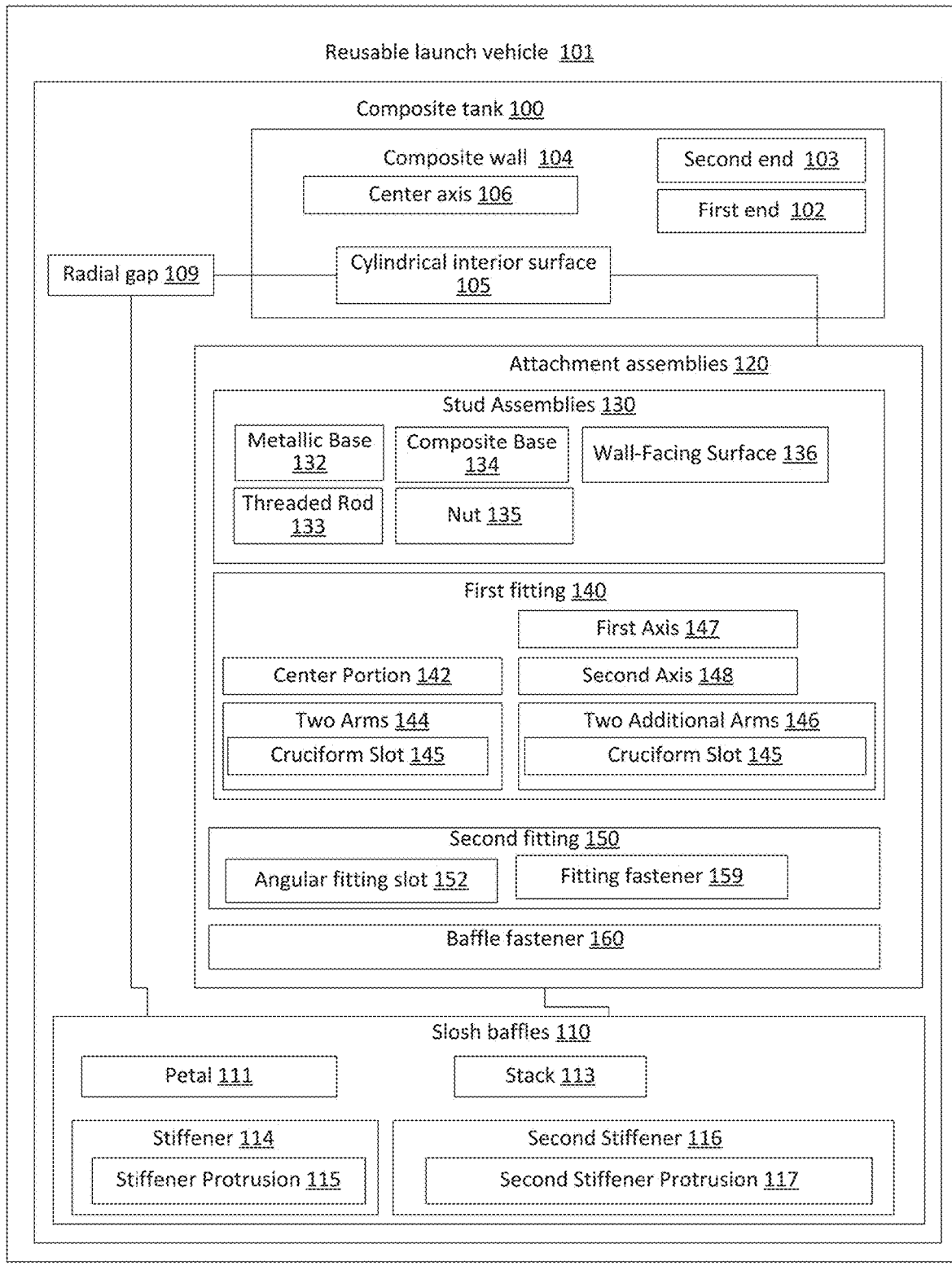
FIG. 1 is a block diagram of a composite tank of a reusable launch vehicle, the tank comprising a composite wall with slosh baffles, attached to the composite wall, according to one or more examples of the subject matter, disclosed herein.
Figure 2A:
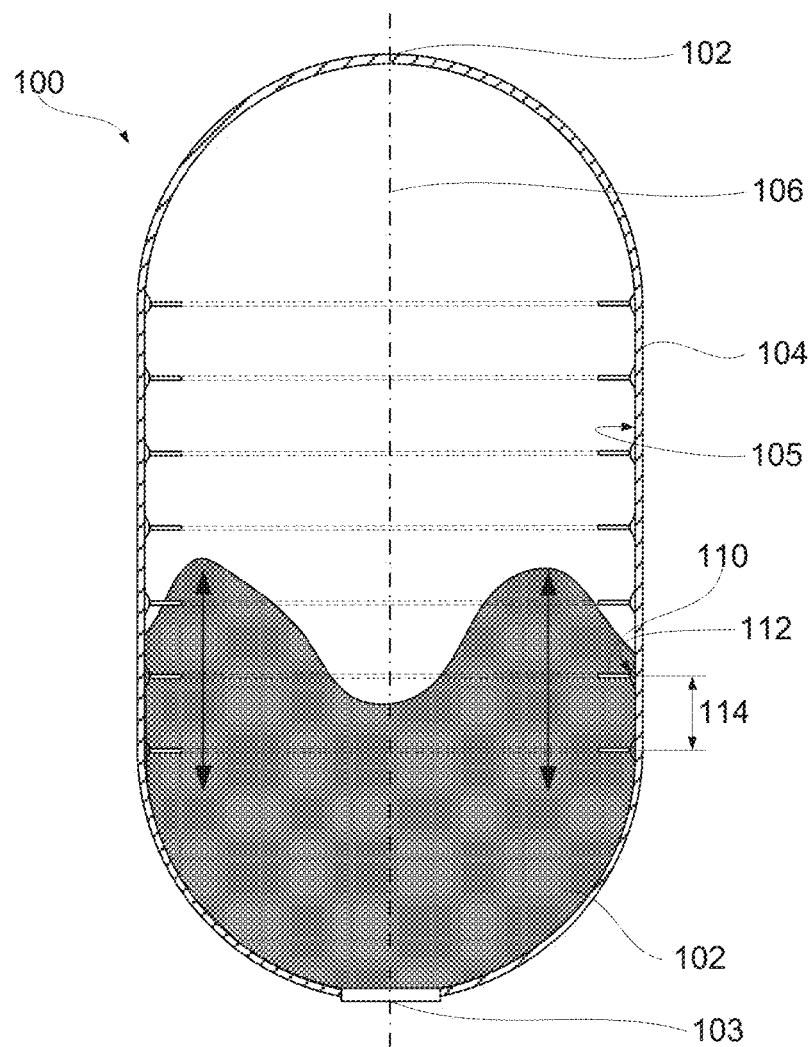
FIGS. 2A and 2B are schematic, side and top cross-sectional views of the composite tank of FIG. 1, illustrating the slosh baffles inside the composite tank, according to one or more examples of the subject matter, disclosed herein.
Figure 2B:
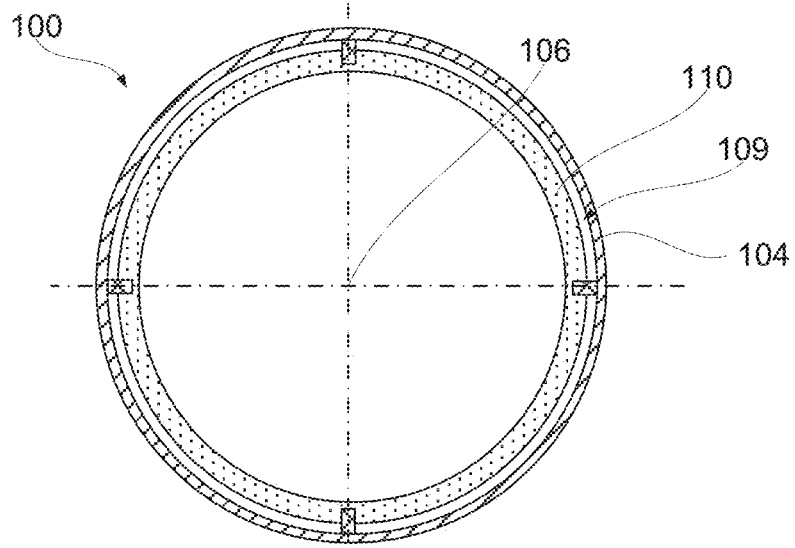

In FIG. 1, referred to above, solid lines, if any, connecting various elements and/or components may represent mechanical, electrical, fluid, optical, electromagnetic, and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented may be combined with some or all of the features shown and described herein.

Figure 6:
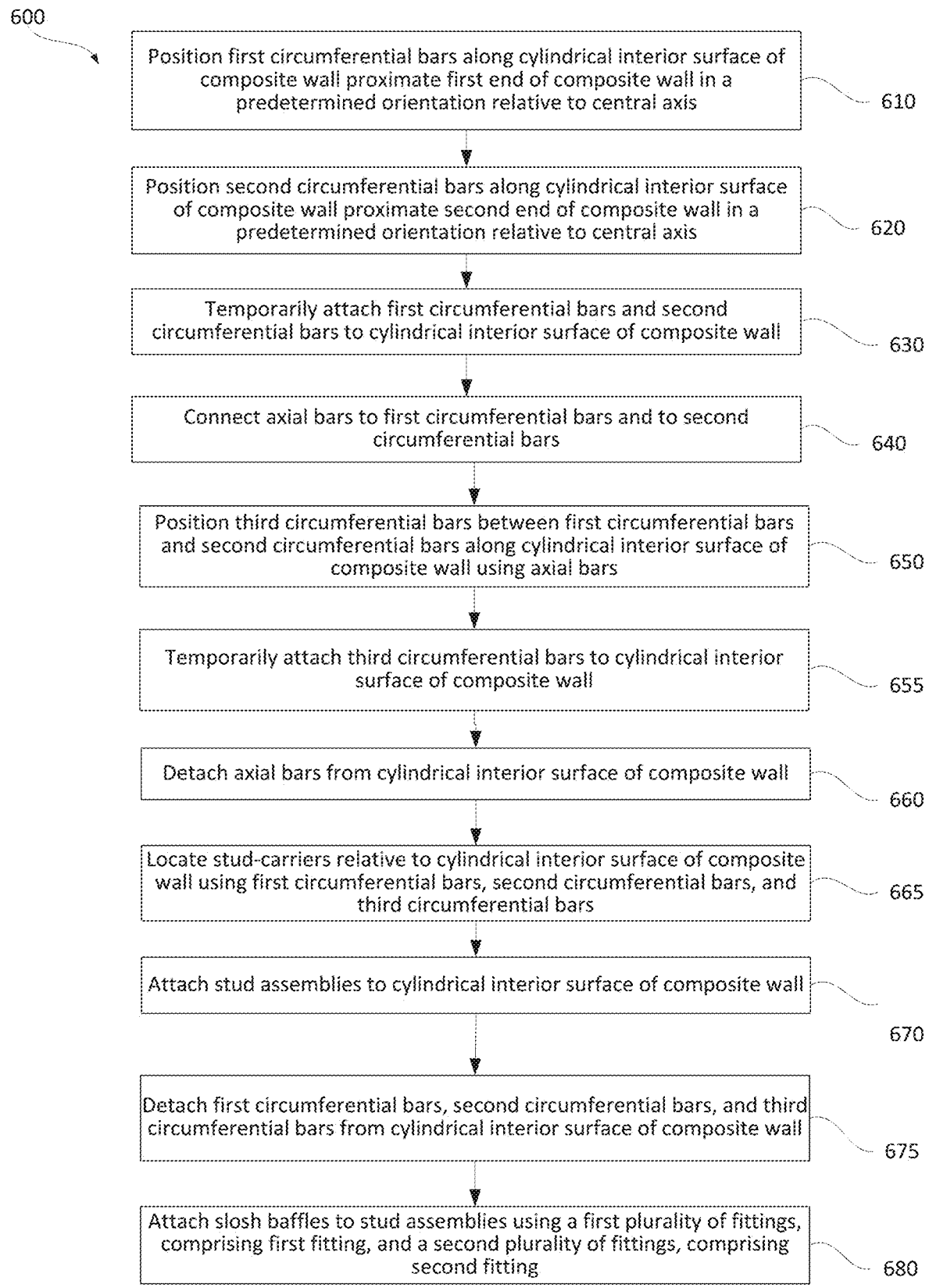
FIG. 6 is a process flowchart, corresponding to a method of fabricating the composite tank of FIG. 1, according to one or more examples of the subject matter, disclosed herein.
Figure 7A:
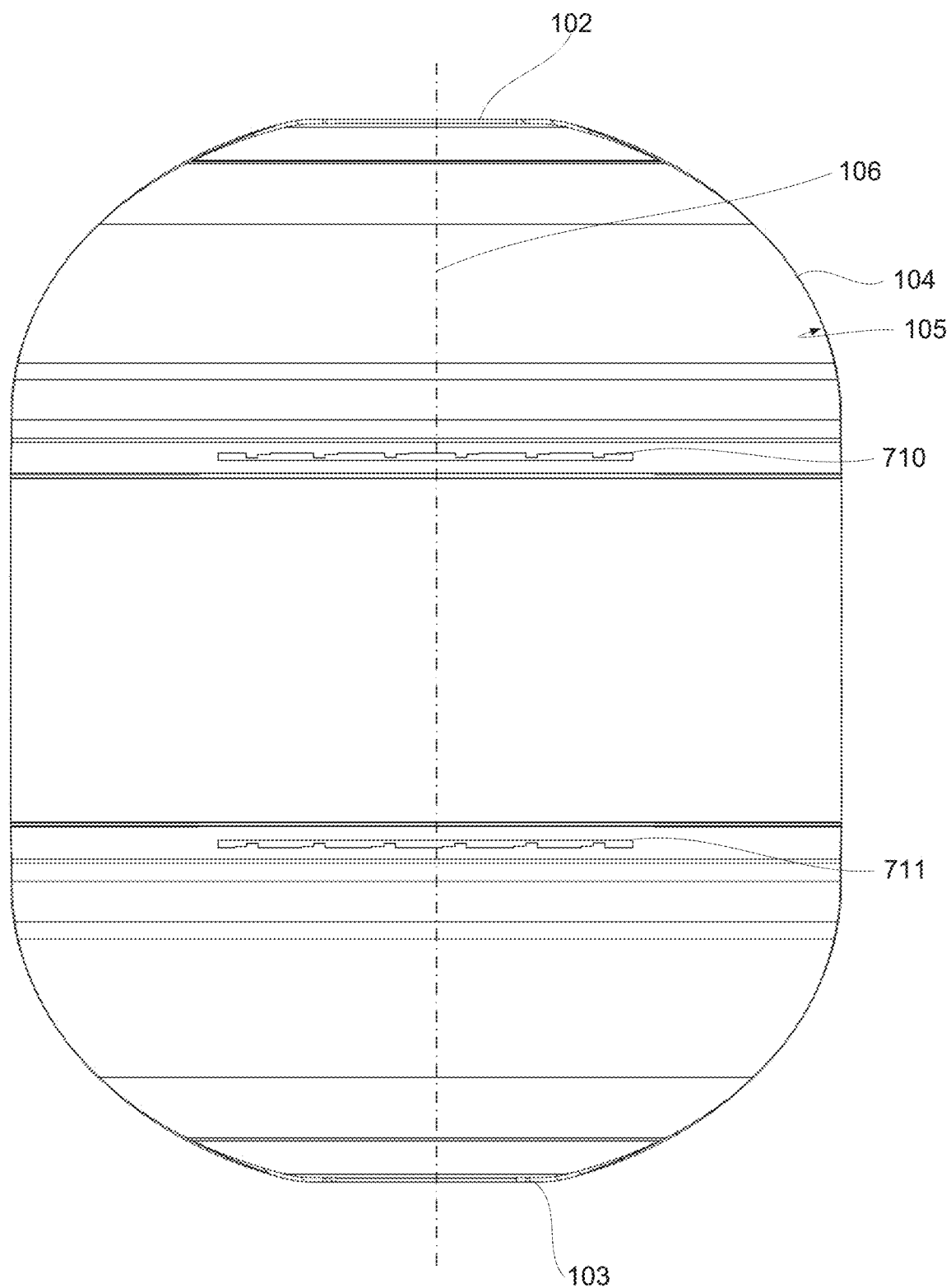
FIG. 7A is a schematic, side cross-sectional view of the composite tank of FIG. 1, illustrating first circumferential bars and second circumferential bars, temporarily attached to the cylindrical interior surface of the composite tank, according to one or more examples of the subject matter, disclosed herein.
Figure 7B:
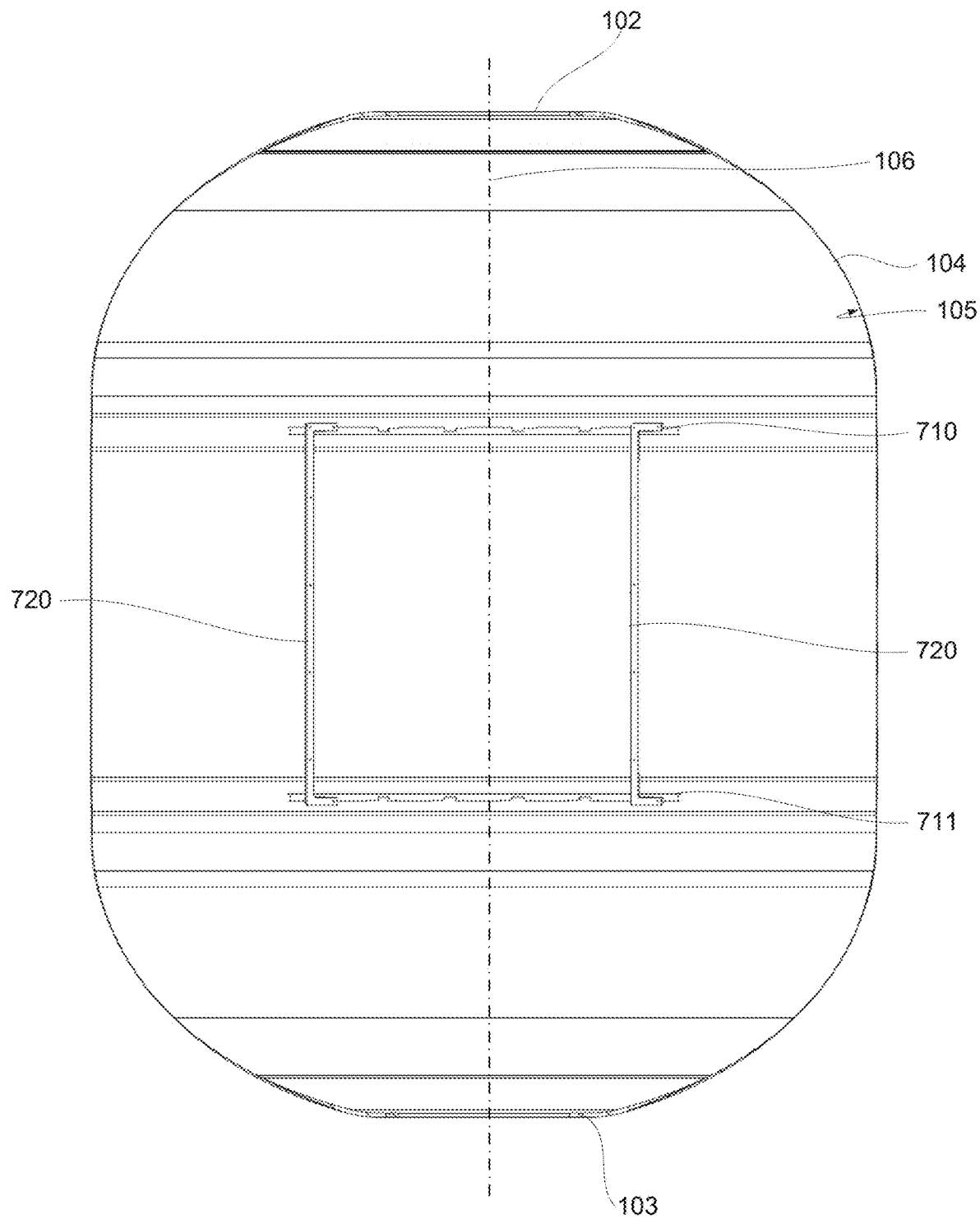
FIG. 7B is a schematic, side cross-sectional view of the composite tank of FIG. 1, illustrating axial bars, connected to the first circumferential bars and the second circumferential bars, according to one or more examples of the subject matter, disclosed herein.
Figure 7C:
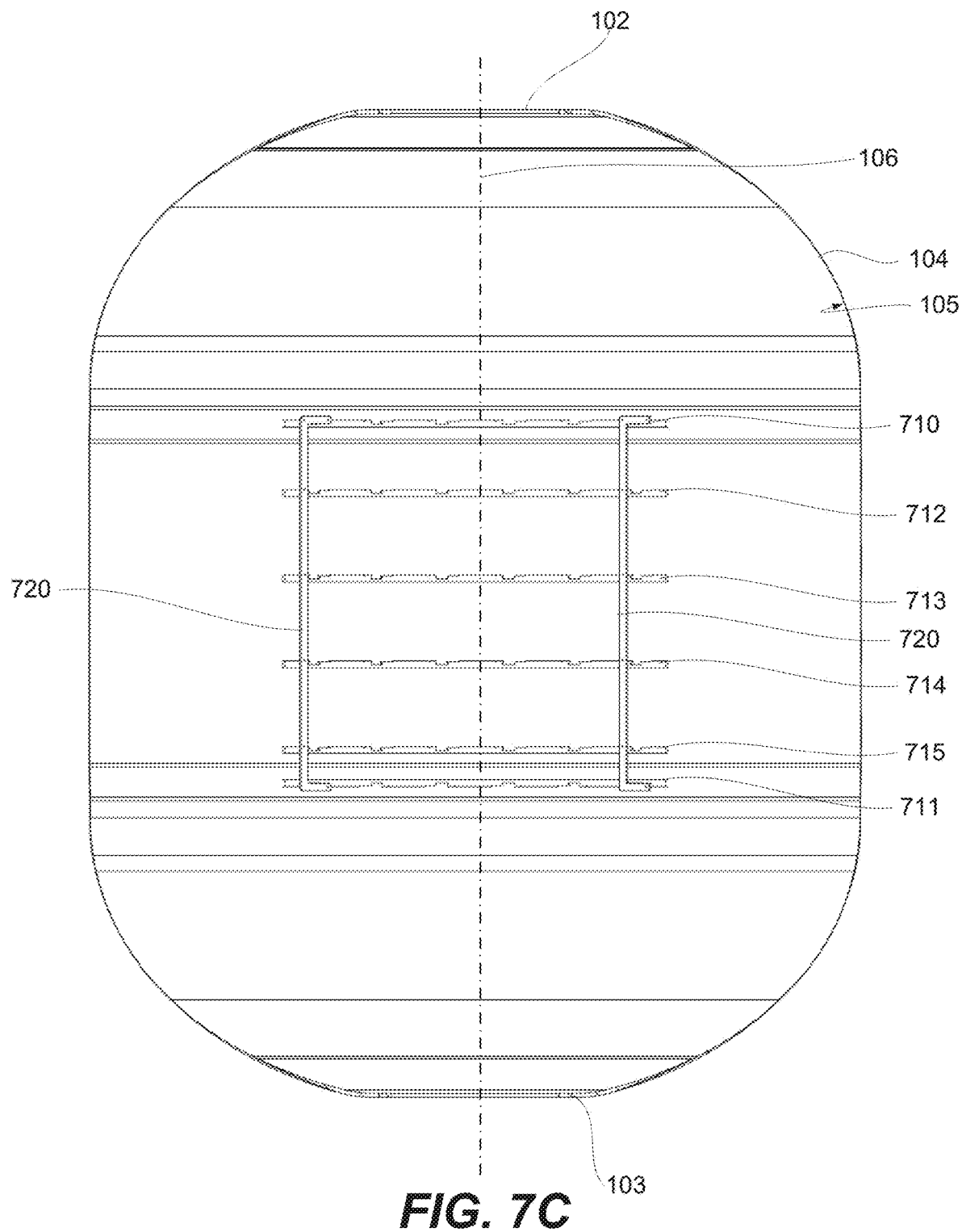
FIG. 7C is a schematic, side cross-sectional view of the composite tank of FIG. 1, illustrating third circumferential bars, positioned between the first circumferential bars and the second circumferential bars using the axial bars, according to one or more examples of the subject matter, disclosed herein.
Figure 7D:
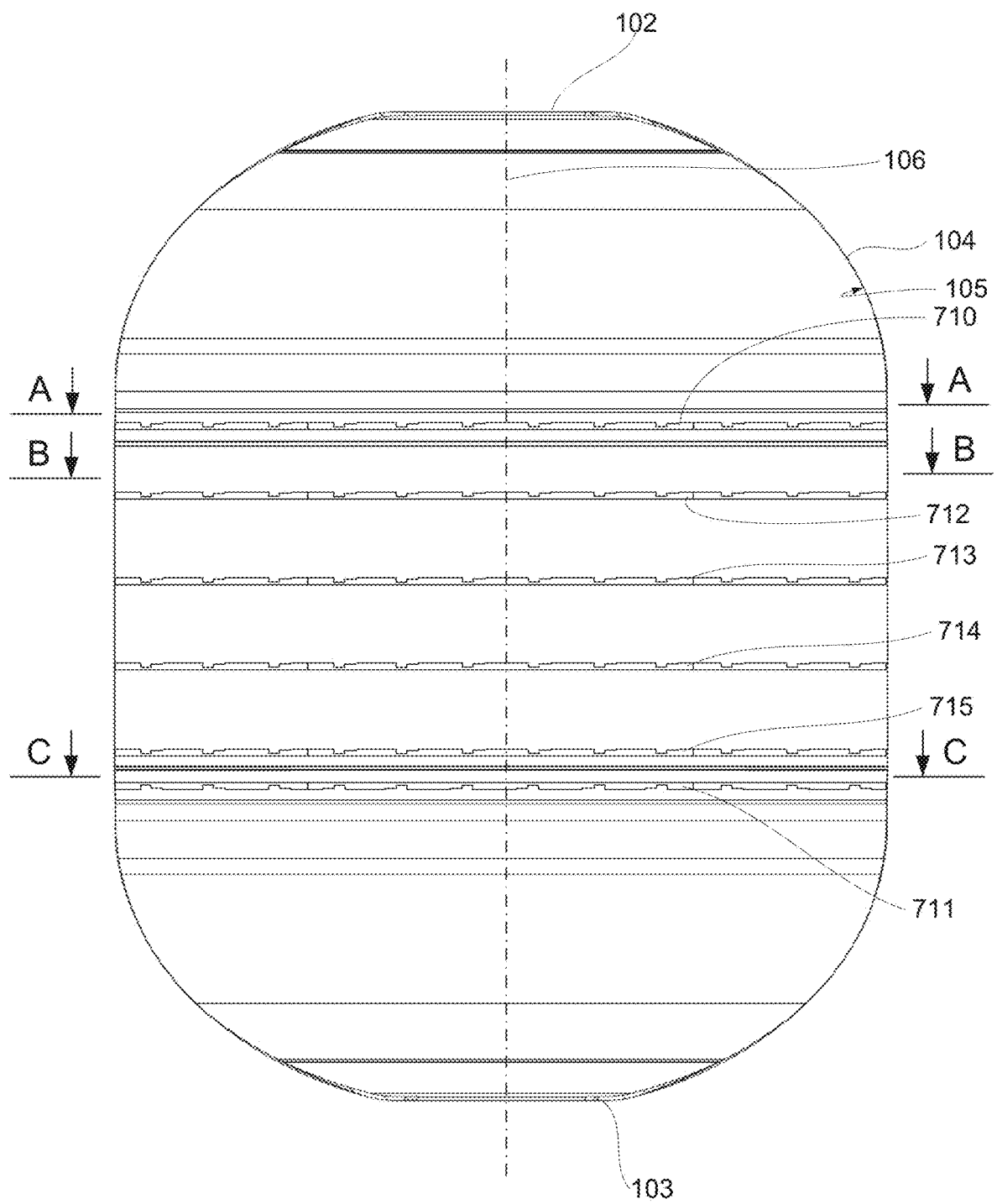
FIG. 7D is a schematic, side cross-sectional view of the composite tank of FIG. 1, illustrating the first circumferential bars, second circumferential bars, and third circumferential bars, temporarily attached to the cylindrical interior surface of the composite wall and with the axial bars removed, according to one or more examples of the subject matter, disclosed herein.
Figure 7E:
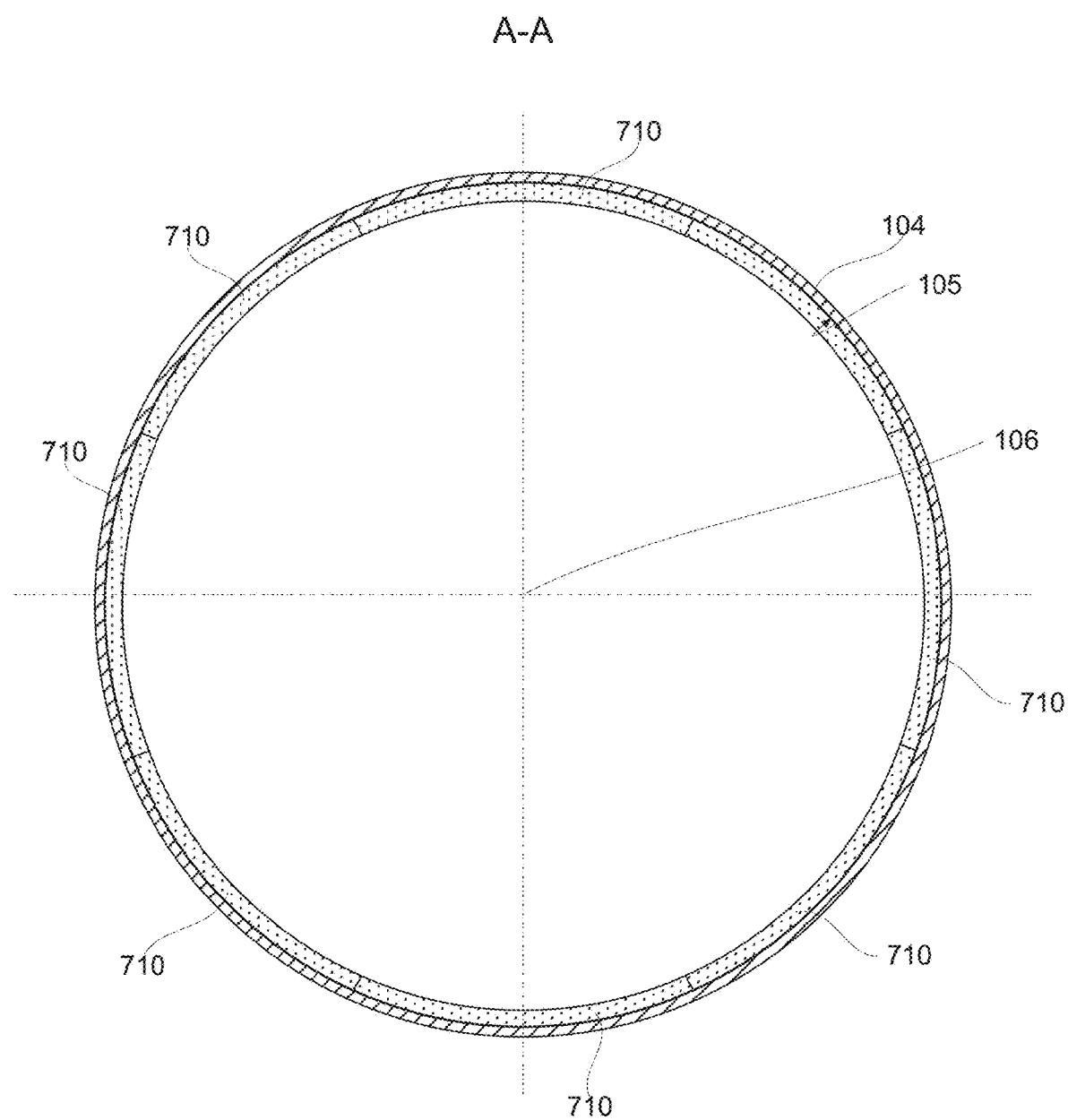
FIGS. 7E-7G are schematic, top cross-sectional views of the composite tank of FIG. 1, illustrating different cross-sections, identified in FIG. 7D, according to one or more examples of the subject matter, disclosed herein.
Figure 7F:
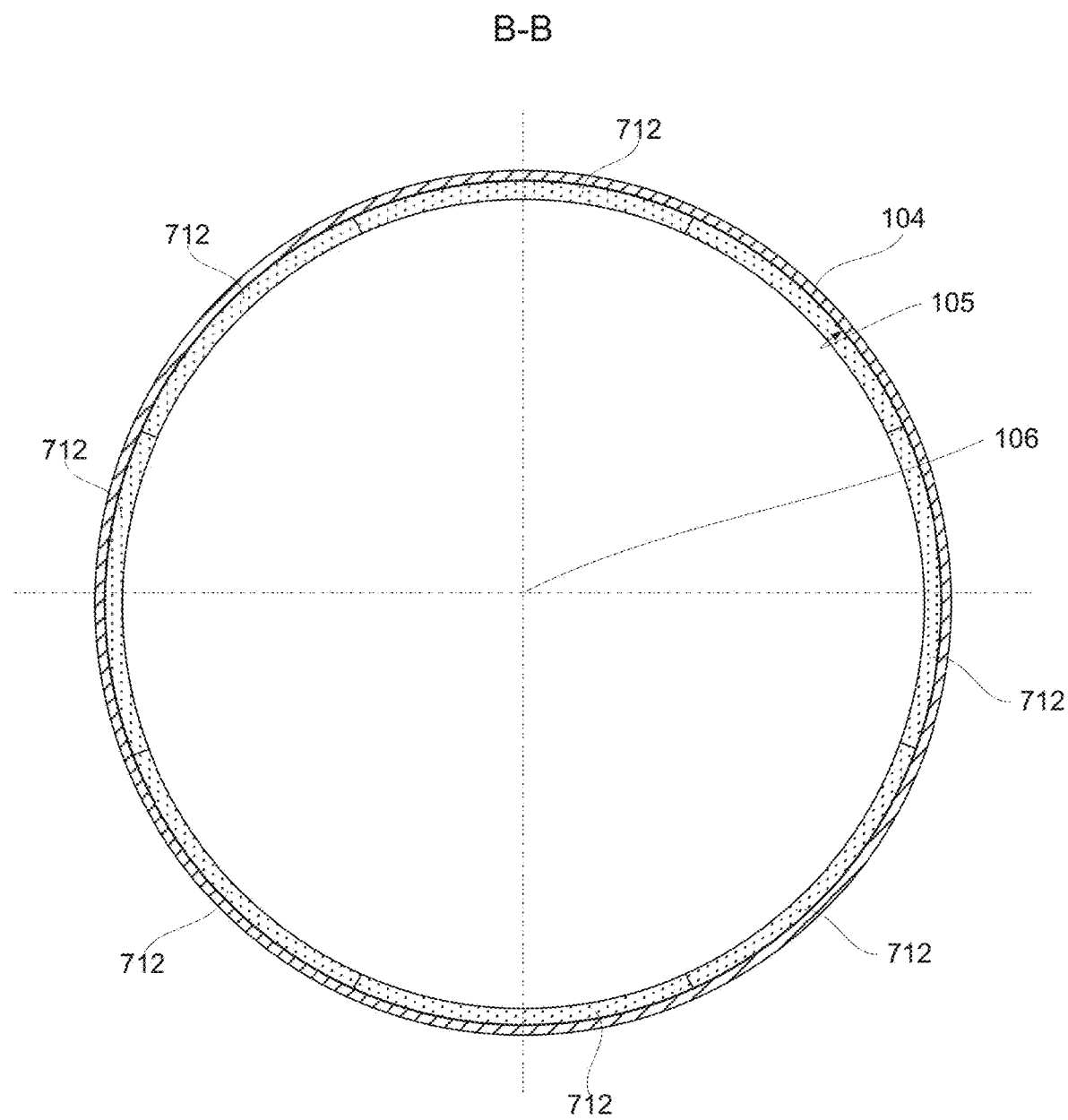
Figure 7G:
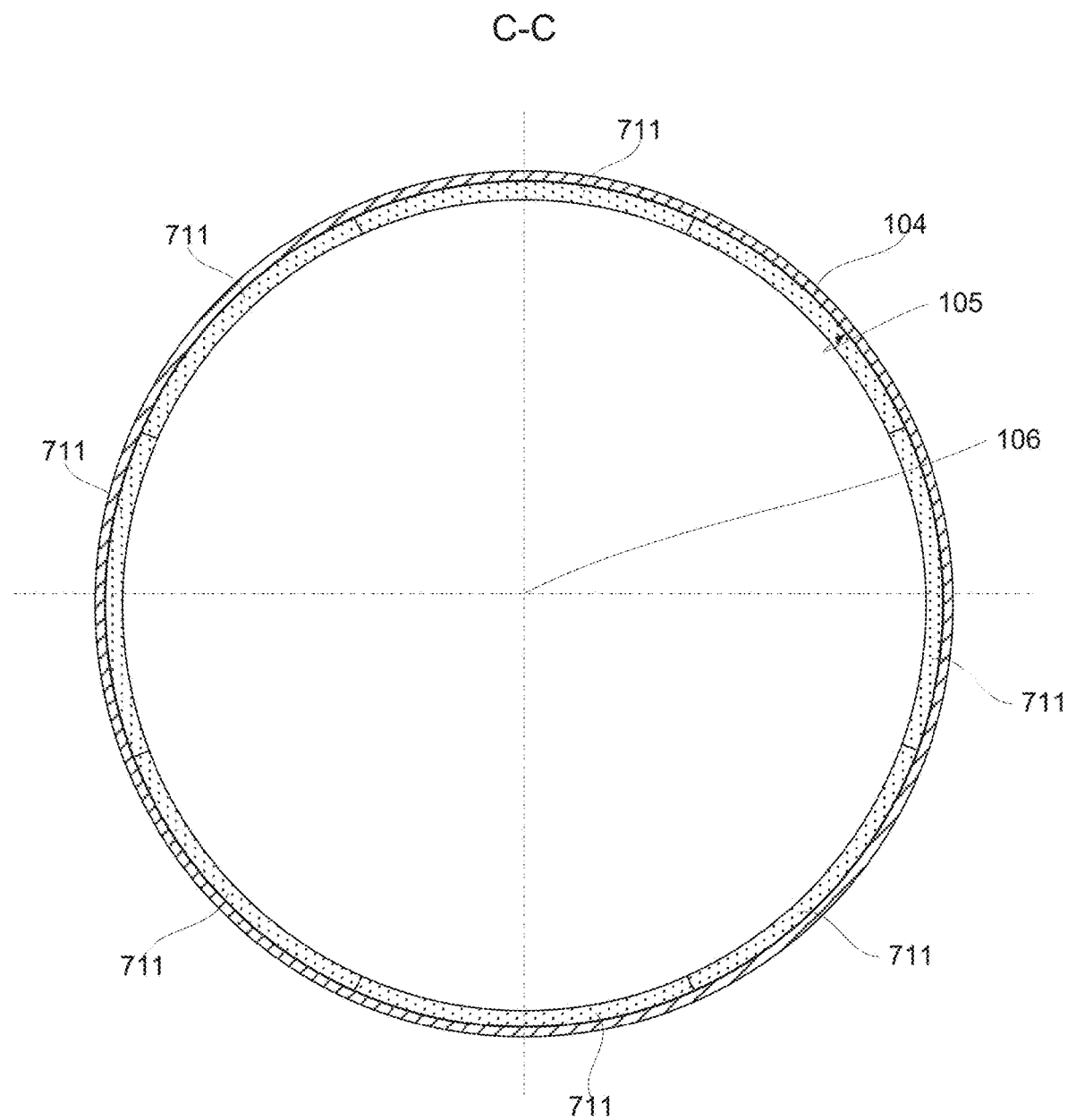
Figure 8A:
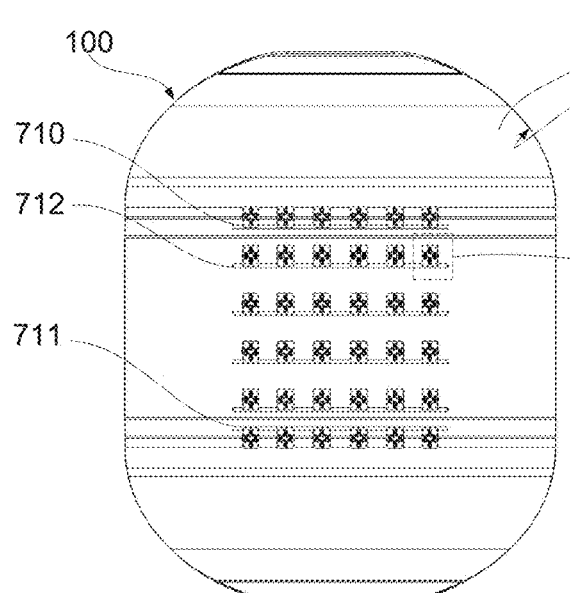
FIG. 8A is a schematic, side cross-sectional view of the composite tank of FIG. 1, illustrating stud-carriers, located relative to the cylindrical interior surface of the composite wall using the first circumferential bars, the second circumferential bars, and the third circumferential bars, according to one or more examples of the subject matter, disclosed herein.
Figure 8B:
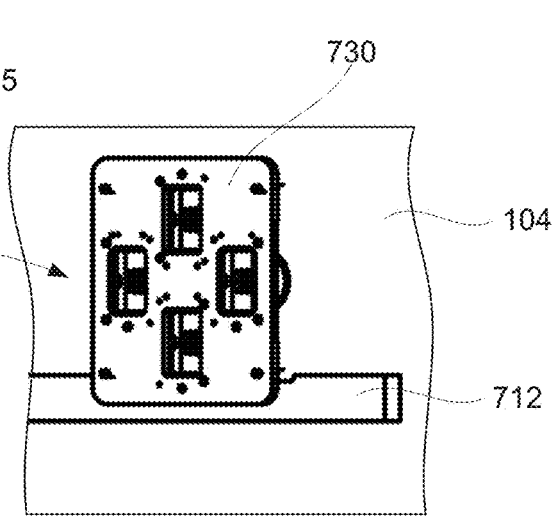
FIG. 8B is a schematic, side cross-sectional view of the composite tank of FIG. 1, illustrating an expanded view of a portion of FIG. 8A, according to one or more examples of the subject matter, disclosed herein.
Figure 8C:
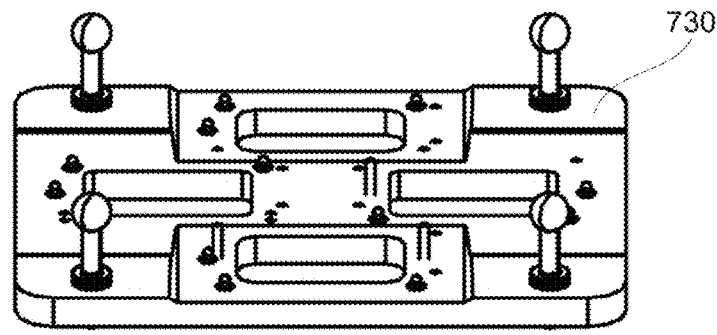
FIG. 8C is a schematic, perspective view of the composite tank of FIG. 1, illustrating a stud-carrier, according to one or more examples of the subject matter, disclosed herein.
Figure 8D:
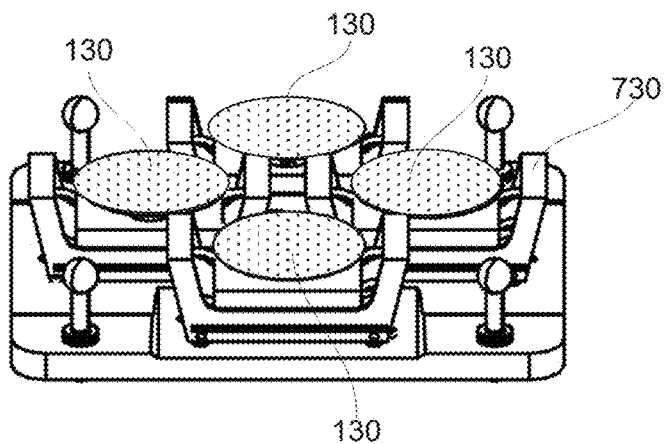
FIG. 8D is a schematic, perspective view of the composite tank of FIG. 1, illustrating a stud-carrier, supporting four of the stud assemblies, according to one or more examples of the subject matter, disclosed herein.
Figure 9A:
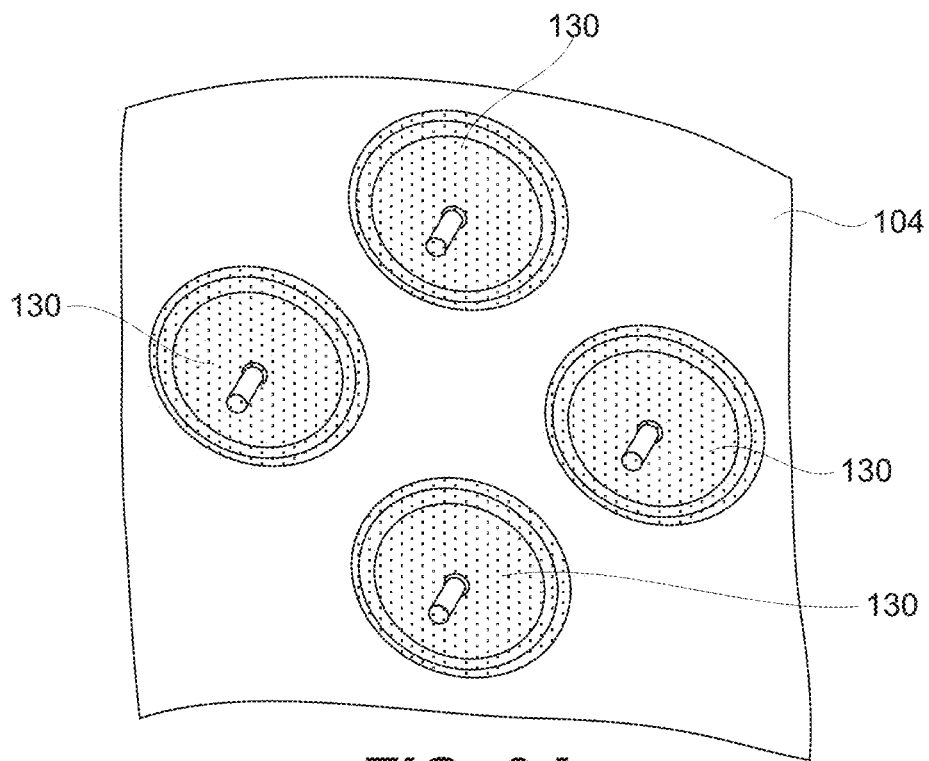
FIG. 9A is a schematic, perspective view of the composite tank of FIG. 1, illustrating stud assemblies, coupled to the cylindrical interior surface of the composite wall, according to one or more examples of the subject matter, disclosed herein.
Figure 9B:
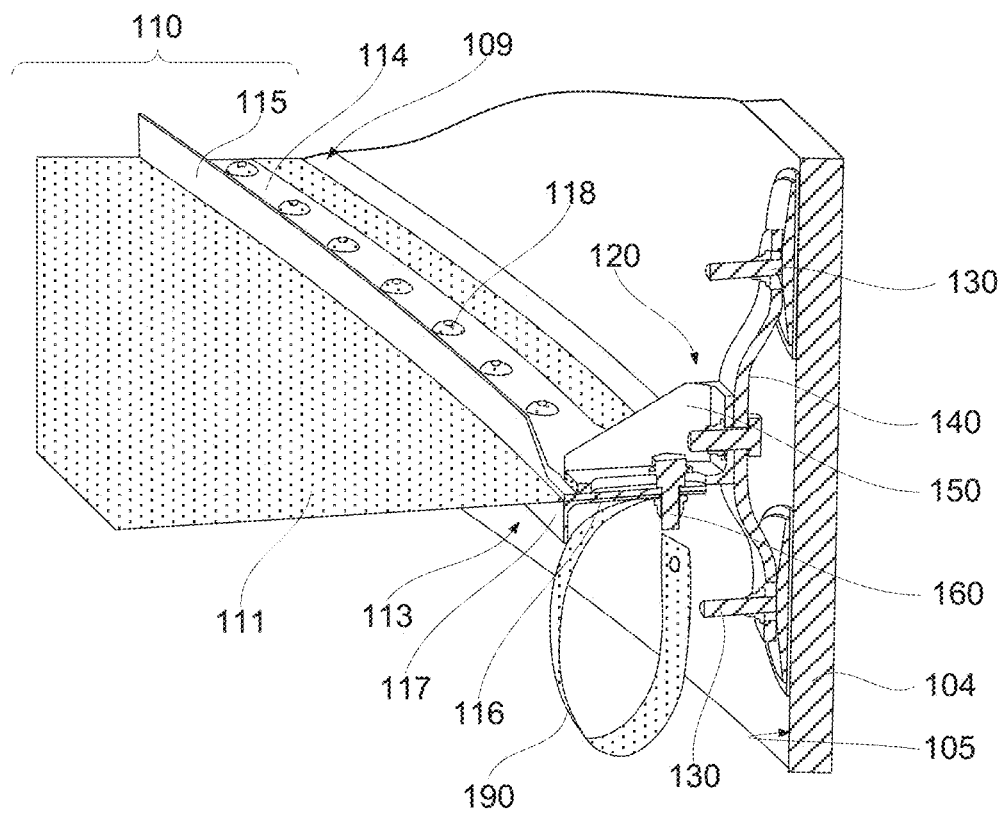
FIG. 9B is a schematic, perspective view of the composite tank of FIG. 1, illustrating a slosh baffles, coupled to the cylindrical interior surface of the composite wall, according to one or more examples of the subject matter, disclosed herein.
Figure 10:
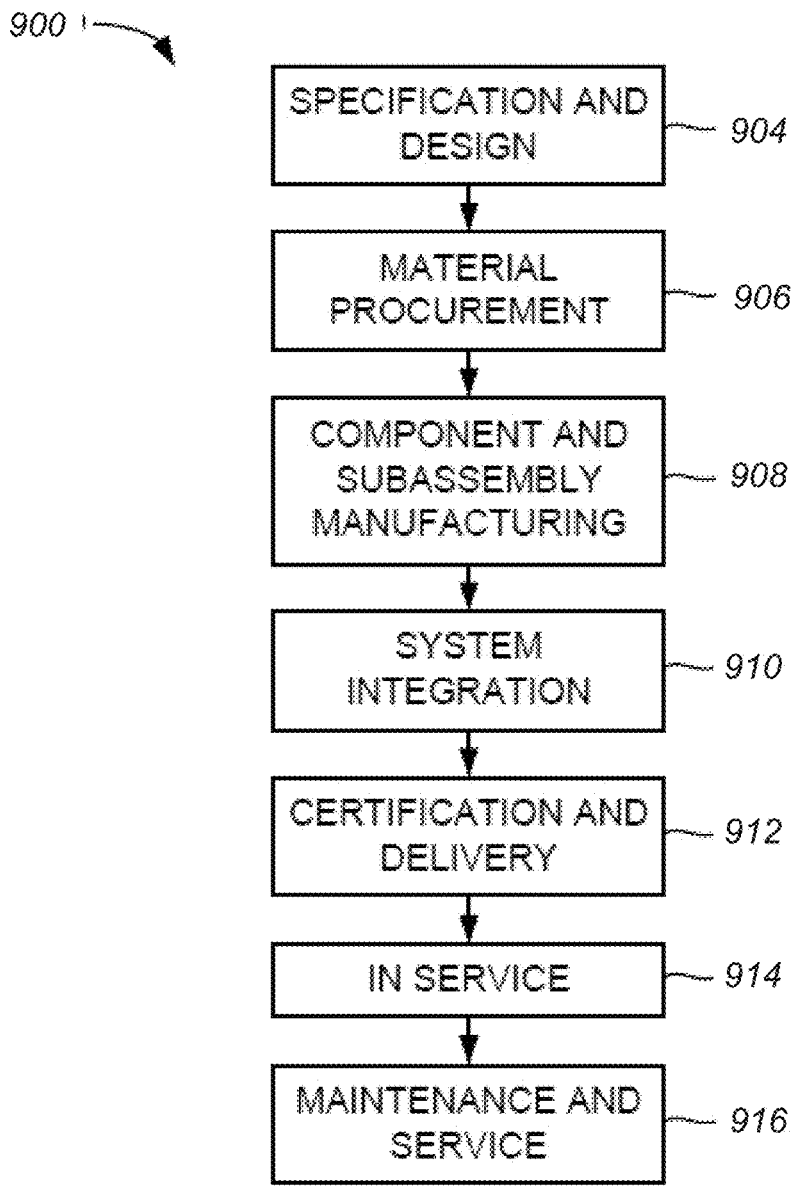
FIG. 10 is a block diagram of aircraft production and service methodology.

In FIGS. 6 and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 6 and 10, and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having the potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 3A-3D, 4A, and 4B, for illustrative purposes only and not by way of limitation, the following portion of this paragraph delineates example 1 of the subject matter, disclosed herein. According to example 1, composite tank 100 for reusable launch vehicle 101 comprises composite wall 104, having a first coefficient of thermal expansion. Composite wall 104 comprises first end 102, second end 103, central axis 106, which passes through first end 102 and through second end 103, and cylindrical interior surface 105. Composite tank 100 also comprises slosh baffles 110, formed from a second material, having a second coefficient of thermal expansion that is different from the first coefficient of thermal expansion. Each of slosh baffles 110 is attached to cylindrical interior surface 105 of composite wall 104. Each of slosh baffles 110 is annular and is separated from cylindrical interior surface 105 of composite wall 104 by radial gap 109, selected, in part, based on a difference between the first coefficient of thermal expansion and the second coefficient of thermal expansion. Radial gap 109 is configured to change responsive to changes in temperature of composite tank 100.

When slosh baffles 110 and composite wall 104 go through the temperature changes (e.g., between −250° C. and 315° C.), slosh baffles 110 and composite wall 104 can experience different size changes due to the difference in their coefficients of thermal expansion. For example, slosh baffles 110 can be formed of metal and have a higher coefficient of thermal expansion than composite wall 104. Radial gap 109 and the connection between slosh baffles 110 and composite wall 104 can accommodate these different size changes without compromising the connection and support to slosh baffles 110. Specifically, slosh baffles 110 can transfer the load from the moving propellant (inside composite tank 100) to composite walls 104 over the entire operating temperature range. Radial gap 109 is selected based on the difference between the first coefficient of thermal expansion of composite wall 104 and the second coefficient of thermal expansion of slosh baffles 110.

In some examples, slosh baffles 110 ensures that the slosh damping occurs over the entire circumference of composite wall 104 or, more specifically, over the entire circumference of cylindrical interior surface 105 of composite wall 104. The width of radial gap 109 is much smaller than the size of slosh baffles 110, both measured perpendicularly to cylindrical interior surface 105 of composite wall 104. As such, only a minimal amount of the propellant can pass through radial gap 109.

In some examples, the attachment of slosh baffles 110 to cylindrical interior surface 105 of composite wall 104 ensures an even distribution of load to cylindrical interior surface 105. As stated above, slosh baffles 110 experience significant loads from the propellant moving inside composite tank 100. Slosh baffles 110 interfere with this motion and transfer the kinetic energy of the propellant to composite wall 104.

Referring generally to FIG. 1 and particularly to, e.g., FIGS. 4A, 4B, and 5A-5E for illustrative purposes only and not by way of limitation, the following portion of this paragraph delineates example 2 of the subject matter, disclosed herein. According to example 2, which encompasses example 1, above, composite tank 100 further comprises attachment assemblies 120, coupling slosh baffles 110 to cylindrical interior surface 105 of composite wall 104. Each of attachment assemblies 120 comprises stud assemblies 130, each bonded to cylindrical interior surface 105 of composite wall 104. Each of attachment assemblies 120 also comprises first fitting 140, attached to stud assemblies 130, and second fitting 150, attached to first fitting 140 and comprising second-fitting slot 152, extending radially relative to cylindrical interior surface 105 of composite wall 104.

Attachment assemblies 120 couple slosh baffles 110 to cylindrical interior surface 105 of composite wall 104 such that radial gap 109 can change in response to the changes in temperature of composite tank 100. For example, second-fitting slot 152 extends radially, relative to cylindrical interior surface 105 and enables slosh baffles 110 to move closer to or further away from cylindrical interior surface 105. This movement may be caused by the temperature change and different coefficient of thermal expansion of composite wall 104 and slosh baffles 110. Furthermore, multiple stud assemblies 130 are spaced apart from each other and are designed to distribute the load through cylindrical interior surface 105. This slosh load is applied by the moving propellant to slosh baffles 110 and is transferred by attachment assemblies 120 to composite wall 104. A large distribution area on cylindrical interior surface 105 of composite wall 104, provided by multiple stud assemblies 130, reduces the risk of stress concentration in composite wall 104.

In some examples, each of attachment assemblies 120 comprises four stud assemblies 130. For example, two of stud assemblies 130 are positioned within the same plane, which is perpendicular to central axis 106. The remaining two of stud assemblies 130 are positioned along a line, parallel to central axis 106.

Figure 4A:
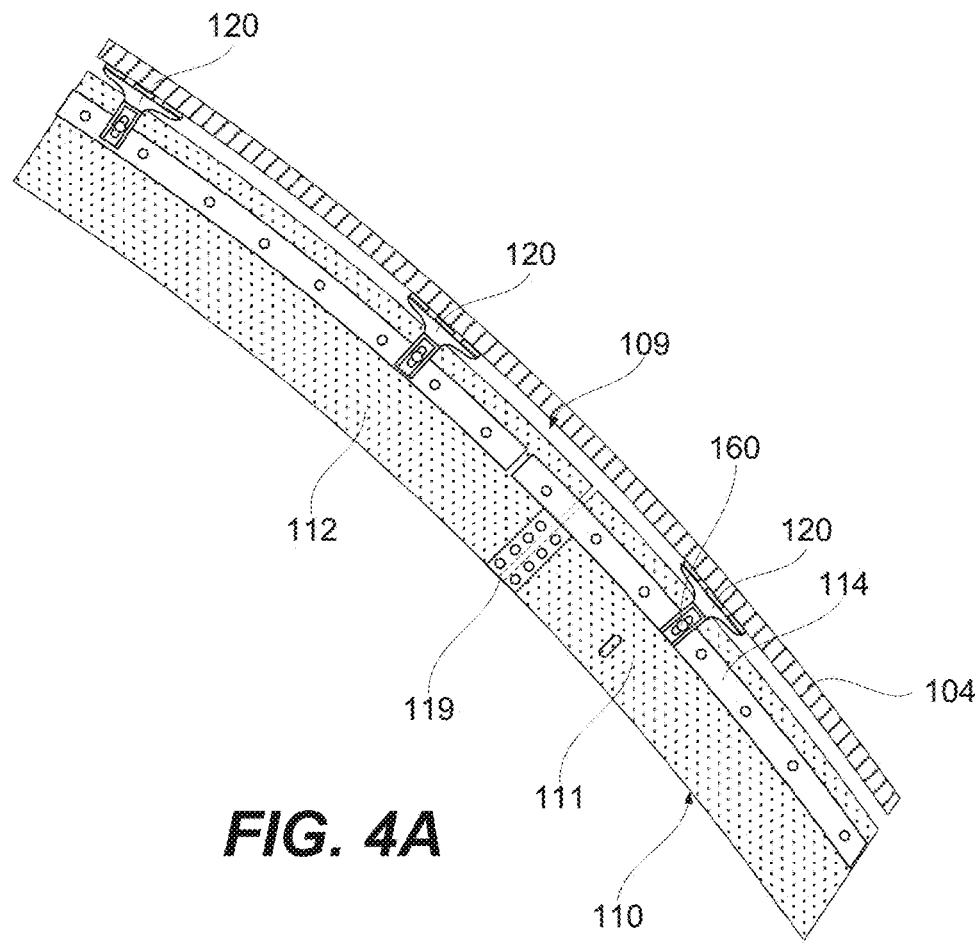
FIGS. 4A and 4B are schematic, top and perspective cross-sectional views of the composite tank of FIG. 1, illustrating attachment of a slosh baffle to the composite wall, according to one or more examples of the subject matter, disclosed herein.
Figure 4B:
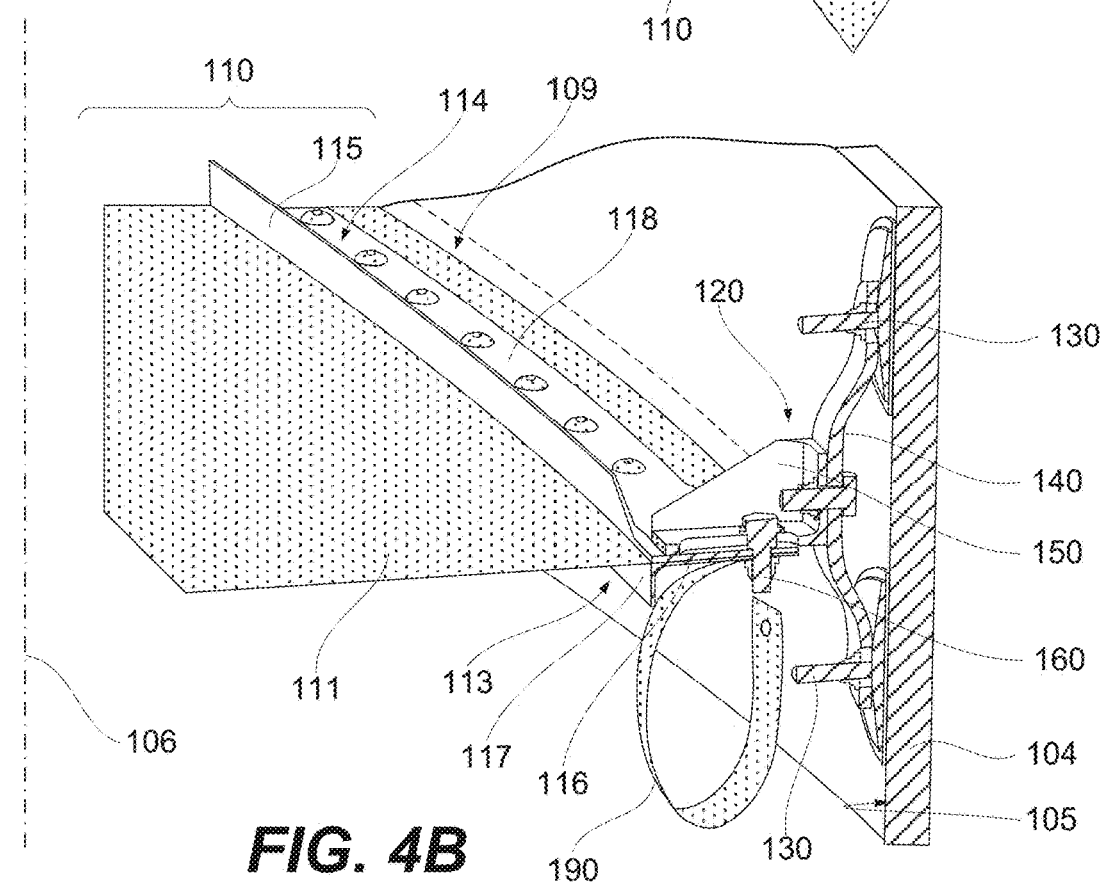

Referring generally to FIG. 1 and particularly to, e.g., FIGS. 4A and 4B for illustrative purposes only and not by way of limitation, the following portion of this paragraph delineates example 3 of the subject matter, disclosed herein. According to example 3, which encompasses example 2, above, composite tank 100 further comprises baffle fastener 160, protruding through second-fitting slot 152 and coupling second fitting 150 to a corresponding one of slosh baffles 110.

Baffle fastener 160 is configured to move within second-fitting slot 152, e.g., closer to or further away from cylindrical interior surface 105. This movement of baffle fastener 160 enables the movement of slosh baffles 110 relative to cylindrical interior surface 105. For example, slosh baffles 110 are fixedly attached to baffle fastener 160.

In some examples, baffle fastener 160 comprises a screw and a nut. However, other types of fasteners are also contemplated. Baffle fastener 160 enables installation of slosh baffles 110 within composite tank 100, e.g., through a small opening on one end of composite tank and after composite wall 104 is formed.

Referring generally to FIG. 1 and particularly to, e.g., FIG. 4A for illustrative purposes only and not by way of limitation, the following portion of this paragraph delineates example 4 of the subject matter, disclosed herein. According to example 4, which encompasses example 2 or 3, above, attachment assemblies of a subset of attachment assemblies 120 couple a single one of slosh baffles 110 to cylindrical interior surface 105 of composite wall 104. The attachment assemblies of the subset of attachment assemblies 120 are evenly circumferentially spaced relative to one another along cylindrical interior surface 105 of composite wall 104.

Multiple ones of attachment assemblies 120 are used to secure each of slosh baffles 110 to cylindrical interior surface 105 of composite wall 104. The even spacing of attachment assemblies 120 along the circumference of cylindrical interior surface 105 provides uniform support to each of slosh baffles 110, around the circumference. Furthermore, this even spacing and multiple ones of attachment assemblies 120 ensure the uniform distribution of the load from slosh baffles 110 to composite wall 104. This slosh load is applied to slosh baffles 110 by the moving propellant relative to slosh baffles 110.

In some examples, attachment assemblies 120 are spaced apart from each other by between about 5° and 60° or, more specifically, by between 10° and 30°. While a smaller spacing between two adjacent ones of attachment assemblies 120 provides more uniform load transfer, the smaller spacing also requires a larger number of attachment assemblies 120, which in turn increases the overall weight of composite tank 100.

Referring generally to FIG. 1 and particularly to, e.g., FIGS. 3A and 3B for illustrative purposes only and not by way of limitation, the following portion of this paragraph delineates example 5 of the subject matter, disclosed herein. According to example 5, which encompasses example 4, above, the subset of attachment assemblies 120 comprises at least three of attachment assemblies 120.

At least three of attachment assemblies 120 ensure support to each of slosh baffles 110 within the plane perpendicular to central axis 106, since the plane can be defined by at least three separate points. Specifically, at least three of attachment assemblies 120 ensures that the load, transferred by attachment assemblies 120 from slosh baffles 110 to composite wall 104, is directed primarily along central axis 106 and does not include any torque components.

In general, the number of attachment assemblies 120 depends on the amount of load, supported by each of slosh baffles 110, the size of attachment assemblies 120, and the circumference length of cylindrical interior surface 105. While a larger number of attachment assemblies 120 provides more uniform load transfer, this larger number of attachment assemblies 120 also increases the overall weight of composite tank 100. In some examples, the number of attachment assemblies 120, supporting each of slosh baffles 110 is three, four, five, six, seven, eight, nine, ten, eleven, twelve, thirteen, fourteen, and so on.

Figure 5A:
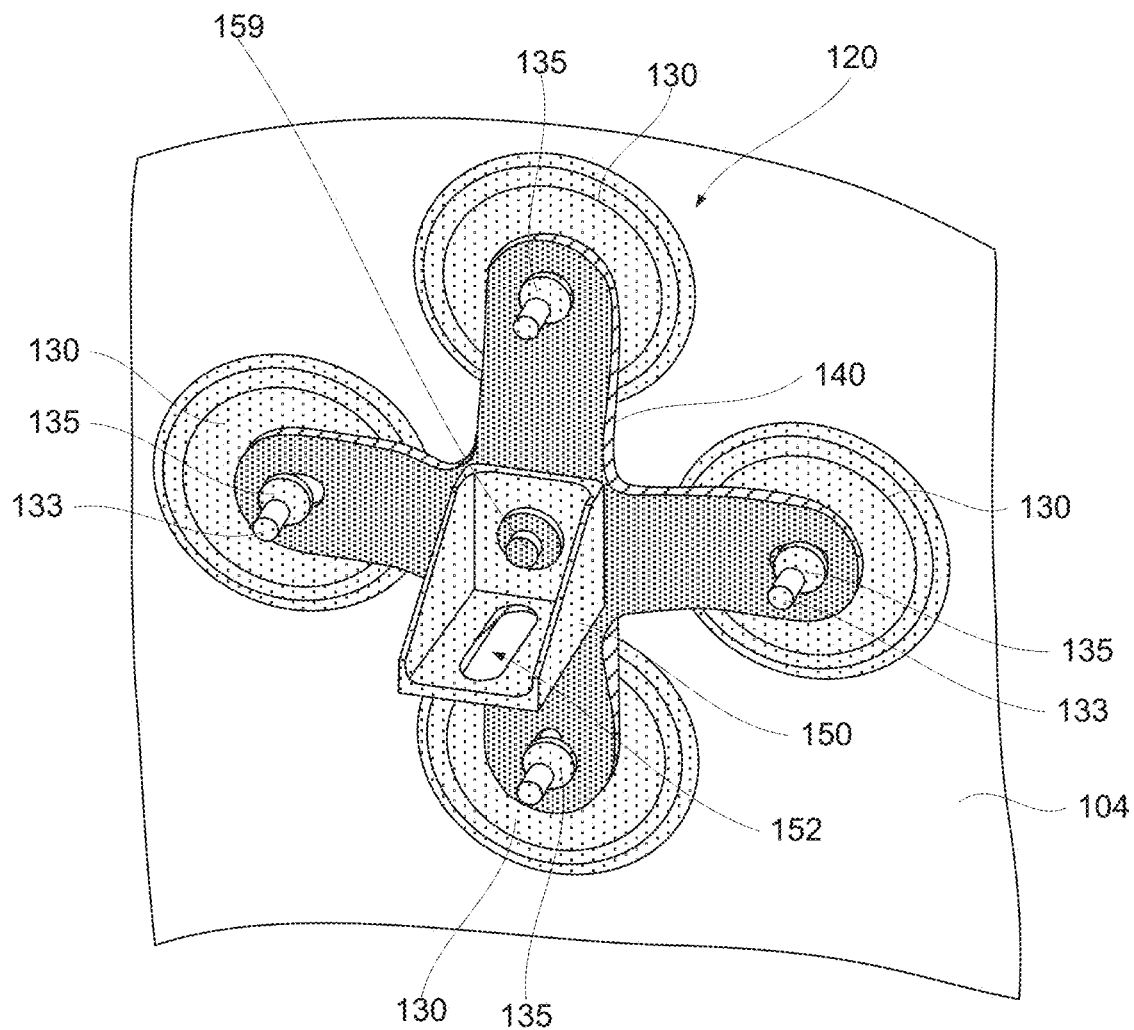
FIG. 5A is a schematic, perspective view of the composite tank of FIG. 1, illustrating an attachment assembly, coupled to the composite wall, according to one or more examples of the subject matter, disclosed herein.
Figure 5B:
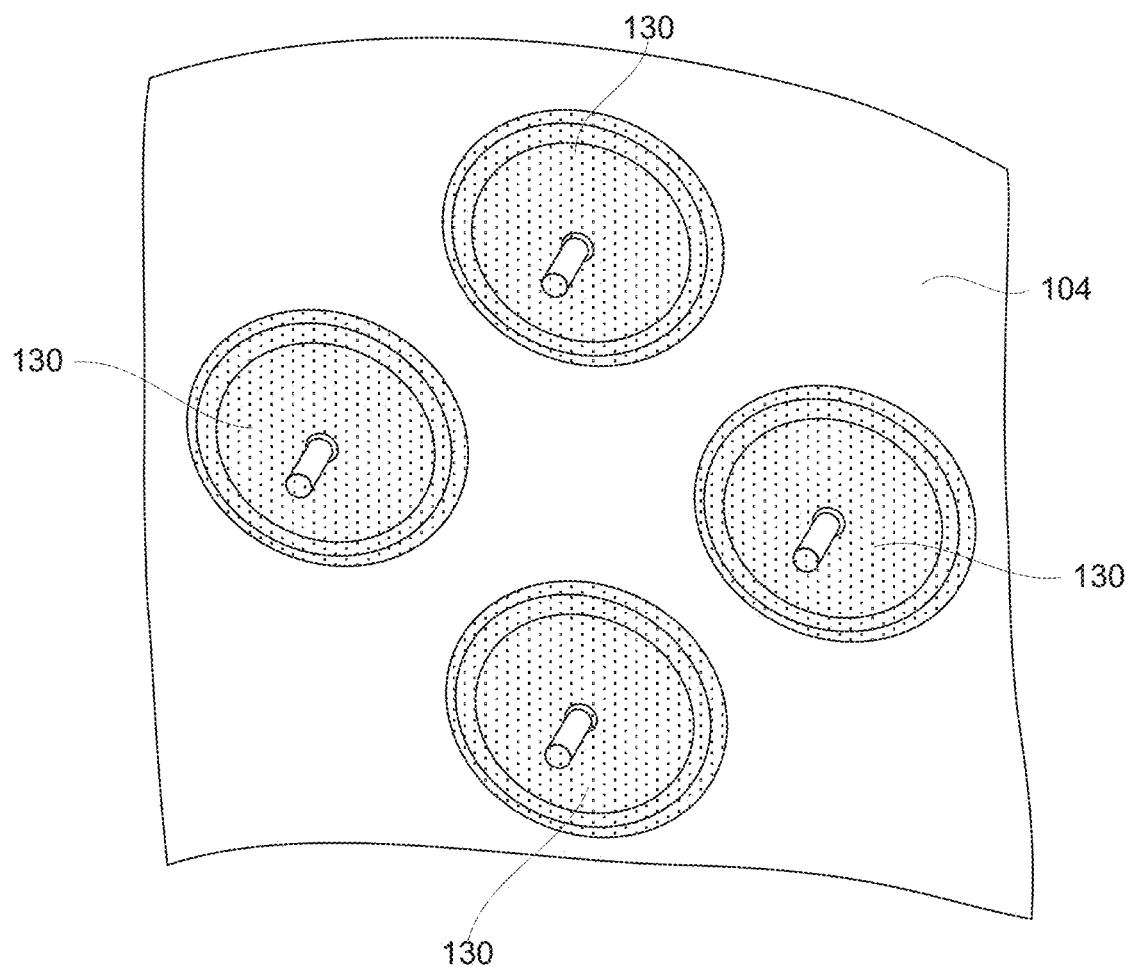
FIG. 5B is a schematic, perspective view of the composite tank of FIG. 1, illustrating four stud assemblies, coupled to the composite wall, according to one or more examples of the subject matter, disclosed herein.
Figure 5C:
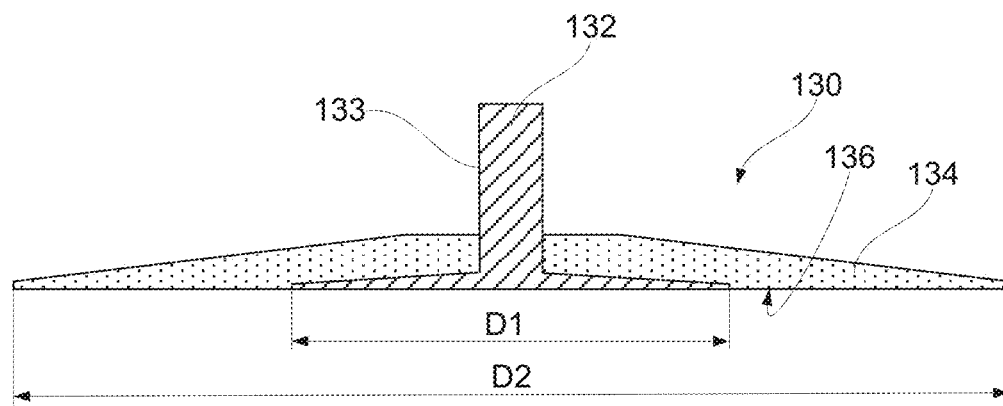
FIG. 5C is a schematic, side cross-sectional view of the composite tank of FIG. 1, illustrating the internal structure of a stud assembly, according to one or more examples of the subject matter, disclosed herein.

Referring generally to FIG. 1 and particularly to, e.g., FIG. 5C for illustrative purposes only and not by way of limitation, the following portion of this paragraph delineates example 6 of the subject matter, disclosed herein. According to example 6, which encompasses any one of examples 2 to 5, above, each of stud assemblies 130 comprises metallic base 132 and composite base 134, which overlaps at least a portion of metallic base 132.

Metallic base 132 is used for attaching the corresponding one of stud assemblies 130 to first fitting 140. For example, a portion of metallic base 132 protrudes through first fitting 140. Furthermore, metallic base 132 provides the overall mechanical strength to the corresponding one of stud assemblies 130, especially in the direction substantially perpendicular to cylindrical interior surface 105 of composite wall 104. On the other hand, the coefficient of thermal expansion of composite base 134 can be closer to and even substantially the same as the coefficient of thermal expansion of composite wall 104. This matching of the coefficients of thermal expansion helps to maintain the connection between each of stud assemblies 130 and composite wall 104 over a large range of operating temperatures.

In some examples, composite base 134 forms a partial shell over metallic base 132 as, e.g., is shown in FIG. 5C. A portion of metallic base 132 protrudes from composite base 134, e.g., to form an attachment with first fitting 140.

Referring generally to FIG. 1 and particularly to, e.g., FIG. 5C for illustrative purposes only and not by way of limitation, the following portion of this paragraph delineates example 7 of the subject matter, disclosed herein. According to example 7, which encompasses example 6, above, metallic base 132 and composite base 134 collectively form wall-facing surface 136 of each of stud assemblies 130.

Wall-facing surface 136 is used for attaching each of stud assemblies 130 to contacts cylindrical interior surface 105 of composite wall 104. The size of and other properties of wall-facing surface 136, such as coefficients of thermal expansion of materials forming wall-facing surface 136, determine the strength and robustness of this attachment over a wide range of temperatures. Metallic base 132 is used, e.g., to provide the overall mechanical strength to wall-facing surface 136. However, the metal, forming metallic base 132, can be heavier than the composite material, forming composite base 134. Furthermore, the coefficients of thermal expansion of composite base 134 and composite wall 104 can be better matched than, e.g., the coefficients of thermal expansion of metal base 132 and composite wall 104. At the same time, composite base 134 increases the overall area of wall-facing surface 136.

In some examples, wall-facing surface 136 is planar. A planar surface is easier to manufacture rather than curved surfaces. Alternatively, wall-facing surface 136 is curved. For example, the curvature of wall-facing surface 136 can be selected to match the curvature of cylindrical interior surface 105 of composite wall 104.

Referring generally to FIG. 1 and particularly to, e.g., FIGS. 5B and 5C for illustrative purposes only and not by way of limitation, the following portion of this paragraph delineates example 8 of the subject matter, disclosed herein. According to example 8, which encompasses example 7, above, wall-facing surface 136 is adhesively coupled to cylindrical interior surface 105 of composite wall 104.

The adhesive, coupling of wall-facing surface 136 of each of stud assemblies 130 to cylindrical interior surface 105 of composite wall 104, preserves the integrity of composite wall 104, e.g., eliminating the need for mounting holes in composite wall 104 or other features. Furthermore, in some examples, the adhesive coupling provides additional flexibility when composite tank 100 undergoes major temperature changes.

Various types of adhesives are contemplated. It should be noted that adhesive coupling enables mounting stud assemblies 130 after composite wall 104 is formed.

Referring generally to FIG. 1 and particularly to, e.g., FIG. 5C for illustrative purposes only and not by way of limitation, the following portion of this paragraph delineates example 9 of the subject matter, disclosed herein. According to example 9, which encompasses example 7 or 8, above, composite base 134 forms a larger portion of wall-facing surface 136 than does metallic base 132.

The composite material of composite base 134 can have a lower specific weight (density) than the metal of metallic base 132. As such, a larger portion of wall-facing surface 136 can be formed using composite base 134 without substantially increasing the overall assembly weight. Furthermore, the coefficient of thermal expansion of composite base 134 can be substantially the same as the coefficient of thermal expansion of composite wall 104 or at least closer than the coefficient of thermal expansion of metallic base 132. In this case, the larger portion of wall-facing surface 136, formed using composite base 134, is more stable relative to cylindrical interior surface 105 of composite wall 104 over a larger temperature range.

Referring generally to FIG. 1 and particularly to, e.g., FIG. 5C for illustrative purposes only and not by way of limitation, the following portion of this paragraph delineates example 10 of the subject matter, disclosed herein. According to example 10, which encompasses example 9, above, a portion of wall-facing surface 136, corresponding to composite base 134, surrounds a portion of wall-facing surface 136, corresponding to metallic base 132.

When the portion of wall-facing surface 136, corresponding to composite base 134, surrounds the portion of wall-facing surface 136, corresponding to metallic base 132, the entire outside edge of wall-facing surface 136 is formed by composite base 134. The coefficient of thermal expansion of composite base 134 can be substantially the same as the coefficient of thermal expansion of composite wall 104 or at least closer to the coefficient of thermal expansion of composite wall 104 than the coefficient of thermal expansion of metallic base 132. In this case, this outer edge of wall-facing surface 136, formed using composite base 134, is more stable relative to cylindrical interior surface 105 of composite wall 104 over a larger temperature range, thereby preserving the attachment of each stud assemblies 130 to cylindrical interior surface 105.

In some examples, the portion of wall-facing surface 136, corresponding to composite base 134, is shaped like a ring. In one or more examples, the portion of wall-facing surface 136, corresponding to metallic base 132, is shaped as a circle.

Referring generally to FIG. 1 and particularly to, e.g., FIG. 5C for illustrative purposes only and not by way of limitation, the following portion of this paragraph delineates example 11 of the subject matter, disclosed herein. According to example 11, which encompasses example 10, above, the portion of wall-facing surface 136, corresponding to composite base 134, has a total area. The portion of wall-facing surface 136, corresponding to metallic base 132, has a total area. The total area of the portion of wall-facing surface 136, corresponding to composite base 134, is greater than the total area of the portion of wall-facing surface 136, corresponding to metallic base 132.

The composite material of composite base 134 can have a lower specific weight (density) than the metal of metallic base 132. As such, a larger portion of wall-facing surface 136 can be formed using composite base 134 without substantially increasing the overall assembly weight. Furthermore, the coefficient of thermal expansion of composite base 134 can be substantially the same as the coefficient of thermal expansion of composite wall 104. At least, the coefficient of thermal expansion of composite base 134 is closer to the coefficient of thermal expansion of composite wall 104 than the coefficient of thermal expansion of metallic base 132. In this case, the larger portion of wall-facing surface 136, formed using composite base 134, is more stable relative to cylindrical interior surface 105 of composite wall 104 over a larger temperature range.

Referring generally to FIG. 1 and particularly to, e.g., FIG. 5C for illustrative purposes only and not by way of limitation, the following portion of this paragraph delineates example 12 of the subject matter, disclosed herein. According to example 12, which encompasses example 11, above, the total area of the portion of wall-facing surface 136, corresponding to composite base 134, is at least two times greater than the total area of the portion of wall-facing surface 136, corresponding to metallic base 132.

The composite material of composite base 134 can have a lower specific weight (density) than the metal of metallic base 132. As such, a larger portion of wall-facing surface 136 can be formed using composite base 134 without substantially increasing the overall assembly weight. Furthermore, the coefficient of thermal expansion of composite base 134 can be substantially the same as the coefficient of thermal expansion of composite wall 104. At least, the coefficient of thermal expansion of composite base 134 is closer to the coefficient of thermal expansion of composite wall 104 than the coefficient of thermal expansion of metallic base 132. In this case, the larger portion of wall-facing surface 136, formed using composite base 134, is more stable relative to cylindrical interior surface 105 of composite wall 104 over a larger temperature range.

In some examples, the total area of the portion of wall-facing surface 136, corresponding to composite base 134, is between two times greater and ten times greater than the total area of the portion of wall-facing surface 136, corresponding to metallic base 132. More specifically, the total area of the portion of wall-facing surface 136, corresponding to composite base 134, is between two times greater and four times greater than the total area of the portion of wall-facing surface 136, corresponding to metallic base 132.

Referring generally to FIG. 1 and particularly to, e.g., FIG. 5C, or illustrative purposes only and not by way of limitation, the following portion of this paragraph delineates example 13 of the subject matter, disclosed herein. According to example 13, which encompasses example 11, above, the total area of the portion of wall-facing surface 136, corresponding to composite base 134, is at least three times greater than the total area of the portion of wall-facing surface 136, corresponding to metallic base 132.

The composite material of composite base 134 can have a lower specific weight (density) than the metal of metallic base 132. As such, a larger portion of wall-facing surface 136 can be formed using composite base 134 without substantially increasing the overall assembly weight. Furthermore, the coefficient of thermal expansion of composite base 134 can be substantially the same as the coefficient of thermal expansion of composite wall 104. At least, the coefficient of thermal expansion of composite base 134 is closer to the coefficient of thermal expansion of composite wall 104 than the coefficient of thermal expansion of metallic base 132. In this case, the larger portion of wall-facing surface 136, formed using composite base 134, is more stable relative to cylindrical interior surface 105 of composite wall 104 over a larger temperature range.

In some examples, the total area of the portion of wall-facing surface 136, corresponding to composite base 134, is between three times greater and ten times greater than the total area of the portion of wall-facing surface 136, corresponding to metallic base 132. More specifically, the total area of the portion of wall-facing surface 136, corresponding to composite base 134, is between three times greater and six times greater than the total area of the portion of wall-facing surface 136, corresponding to metallic base 132.

Referring generally to FIG. 1 and particularly to, e.g., FIG. 5C for illustrative purposes only and not by way of limitation, the following portion of this paragraph delineates example 14 of the subject matter, disclosed herein. According to example 14, which encompasses any one of examples 6 to 13, above, each of stud assemblies 130 further comprises threaded rod 133, extending from metallic base 132 through composite base 134 and through first fitting 140.

Threaded rod 133 is used for attaching first fitting 140. Specifically, threaded rod 133 protrudes through first fitting 140 and is secured by a nut. Threaded rod 133 enables forming attachment assemblies 120 inside composite tank 100. For example, stud assemblies 130 are bonded to cylindrical interior surface 105 of composite wall 104. First fitting 140 is then attached to stud assemblies 130.

In some examples, threaded rod 133 extends from composite base 134 such that first fitting 140, when attached, is compressed between the nut and composite base 134. In more specific examples, threaded rod 133 is at least partially extends into composite base 134. For example, metallic base 132 is manufactured first. Composite base 134 is later formed around metallic base 132.

Referring generally to FIG. 1 and particularly to, e.g., FIG. 5A for illustrative purposes only and not by way of limitation, the following portion of this paragraph delineates example 15 of the subject matter, disclosed herein. According to example 15, which encompasses example 14, above, each of stud assemblies 130 further comprises nut 135, threaded onto threaded rod 133 such that nut 135 biases first fitting 140 against composite base 134 of each of stud assemblies 130.

Nut 135 is threaded onto threaded rod 133 and supports first fitting 140 on threaded rod 133. More specifically, nut 135 compressed first fitting 140 against composite base 134 of the corresponding one of stud assemblies 130. Furthermore, a combination of threaded rod 133 and nut 135 enables forming attachment assemblies 120 inside composite tank 100. For example, stud assemblies 130 are bonded to cylindrical interior surface 105 of composite wall 104. First fitting 140 is then attached to stud assemblies 130.

In some examples, nut 135 also enables removal of first fitting 140 from stud assemblies 130, e.g., during repair of composite tank 100, realignment, and other purposes. In these examples, nut 135 is at least partially unscrewed from threaded rod 133.

Referring generally to FIG. 1 and particularly to, e.g., FIGS. 4D and 4E for illustrative purposes only and not by way of limitation, the following portion of this paragraph delineates example 16 of the subject matter, disclosed herein. According to example 16, which encompasses any one of examples 6 to 15, above, metallic base 132 of each of stud assemblies 130 is formed from a nickel-iron alloy.

The coefficient of thermal expansion of the nickel-iron alloy can be close to the coefficient of thermal expansion of composite wall 104, in comparison for example to other metals. As such, metallic base 132, formed from a nickel-iron alloy, can maintain a stable adhesion to cylindrical interior surface 105 of composite wall 104 over a large temperature range.

One example of the nickel-iron alloy is invar, which has a low thermal expansion of about $1.2 \times 10^{-6}$ $K^{-1}$ (between 20° C. and 100° C.). For comparison, the thermal expansion of many composites is close to zero, while the thermal expansion of conventional steel is 10-20 times greater than that of Invar. Invar comprises about 64% of iron and about 36% of nickel. However, other examples of nickel-iron alloys are also contemplated.

Figure 5D:
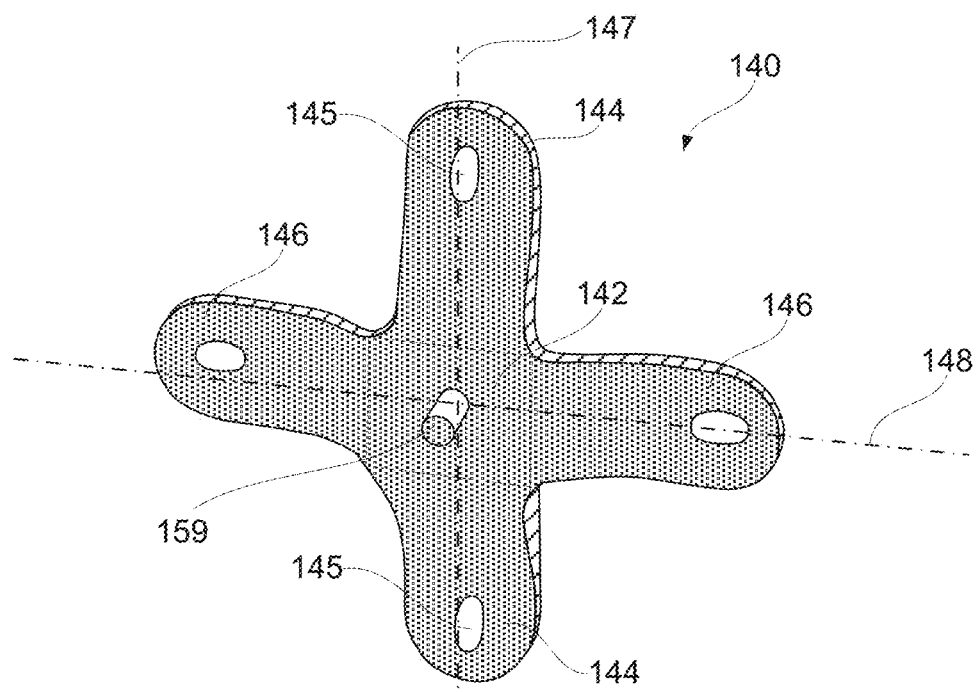
FIG. 5D is a schematic, perspective view of the composite tank of FIG. 1, illustrating a first fitting, before attaching the first fitting to any other components of the composite tank, according to one or more examples of the subject matter, disclosed herein.
Figure 5E:
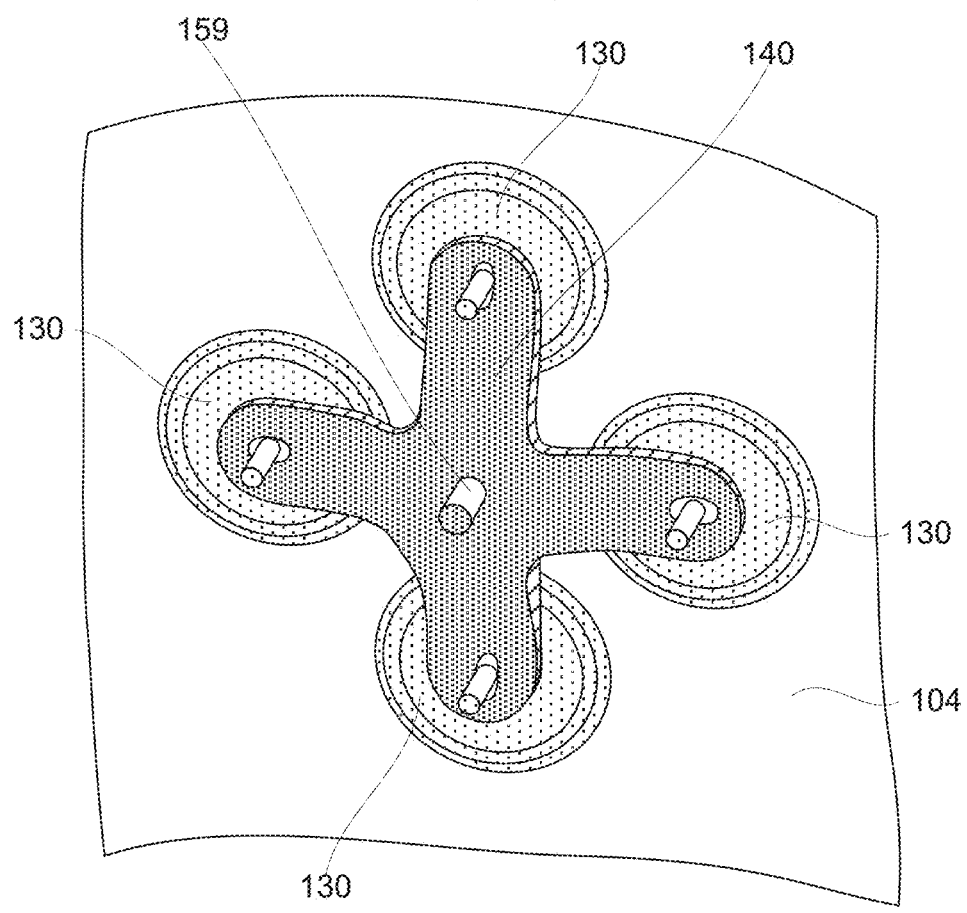
FIG. 5E is a schematic, perspective view of the composite tank of FIG. 1, illustrating a first fitting, slid over the stud assemblies, attached to the composite wall, according to one or more examples of the subject matter, disclosed herein.

Referring generally to FIG. 1 and particularly to, e.g., FIGS. 5D and 5E for illustrative purposes only and not by way of limitation, the following portion of this paragraph delineates example 17 of the subject matter, disclosed herein. According to example 17, which encompasses any one of examples 2 to 16, above, first fitting 140 comprises center portion 142 and two arms 144, extending from center portion 142 in opposite directions along first axis 147. Center portion 142 is attached to second fitting 150. Each of two arms 144 is attached to a respective one of stud assemblies 130.

Two arms 144, extending from center portion 142, help to distribute the load, applied to cylindrical interior surface 105 of composite wall 104. Specifically, slosh baffles 110 can transfer the load from the moving propellant (inside composite tank 100) to composite walls 104 through each of attachment assemblies 120, comprising stud assemblies 130 bonded to cylindrical interior surface 105, first fitting 140 attached to the stud assemblies 130, and second fitting 150 attached to first fitting 140 and slosh baffles 110.

In some examples, first axis 147 is substantially parallel to central axis 106 of composite wall 104. It should be noted that slosh baffles 110 are designed to mitigate the propellant movement, primarily along central axis 106.

Referring generally to FIG. 1 and particularly to, e.g., FIGS. 5D and 5E for illustrative purposes only and not by way of limitation, the following portion of this paragraph delineates example 18 of the subject matter, disclosed herein. According to example 18, which encompasses example 17, above, each of two arms 144 of first fitting 140 comprises slot 145. A portion of a respective one of stud assemblies 130 protrudes through slot 145.

Slot 145 enables the respective one of stud assemblies 130 to move (within slot 145) relative to first fitting 140. For example, first fitting 140 and composite wall 104 may have different coefficients of thermal expansions. As such, during the operation of composite tank 100 at different temperatures the distance between two of stud assemblies 130 and the distance between reference points at two arms 144 of first fitting 140 can change differently. Slot 145 accommodates this movement caused by different coefficients of thermal expansions.

In some examples, the width-to-length of slot 145 is between 1.5 and 5 or, more specifically, between 2 and 4. The width of slot 145 can be only slightly larger than the portion of the respective one of stud assemblies 130 protruding through slot 145.

Referring generally to FIG. 1 and particularly to, e.g., FIGS. 5D and 5E for illustrative purposes only and not by way of limitation, the following portion of this paragraph delineates example 19 of the subject matter, disclosed herein. According to example 19, which encompasses example 17 or 18, above, first fitting 140 further comprises two additional arms 146, extending from center portion 142, in opposite directions, along second axis 148, perpendicular to first axis 147. Each of two additional arms 146 is attached to a respective one of stud assemblies 130.

Two additional arms 146, extending from center portion 142, further help to distribute the load, applied to cylindrical interior surface 105 of composite wall 104. Specifically, slosh baffles 110 can transfer the load from the moving propellant (inside composite tank 100) to composite walls 104 through each of attachment assemblies 120, comprising stud assemblies 130 bonded to cylindrical interior surface 105, first fitting 140 attached to stud assemblies 130, and second fitting 150 attached to first fitting 140 and slosh baffles 110. Two arms 144 and two additional arms 146 help with the load distribution along different directions.

In some examples, first axis 147 is substantially parallel to central axis 106 of composite wall 104. As such, the load distribution, provided by two additional arms 146, is in a plane, perpendicular to central axis 106. It should be noted that slosh baffles 110 are coplanar or at least parallel to this plane.

Referring generally to FIG. 1 and particularly to, e.g., FIGS. 5A, 5D, and 5E for illustrative purposes only and not by way of limitation, the following portion of this paragraph delineates example 20 of the subject matter, disclosed herein. According to example 20, which encompasses any one of examples 2 to 19, above each one of attachment assemblies 120 further comprises fitting fastener 159 that interconnects first fitting 140 and second fitting 150.

Fitting fastener 159 connects second fitting 150 to first fitting 140 and ensures the load transfer from slosh baffles 110 to composite walls 104. Furthermore, fitting fastener 159 enables forming attachment assemblies 120 and connecting attachment assemblies 120 to slosh baffles 110 and to composite walls 104 inside composite tank 100.

In some examples, fitting fastener 159 is a threaded rod, attached to or integral to first fitting 140. For example, fitting fastener 159 can be welded to first fitting 140.

Referring generally to FIG. 1 and particularly to, e.g., FIGS. 5A, 5D, and 5E for illustrative purposes only and not by way of limitation, the following portion of this paragraph delineates example 21 of the subject matter, disclosed herein. According to example 21, which encompasses example 20, above, fitting fastener 159 protrudes through first fitting 140 and through second fitting 150.

Fitting fastener 159 connects second fitting 150 to first fitting 140 and ensures the load transfer from slosh baffles 110 to composite walls 104. Furthermore, fitting fastener 159 enables forming attachment assemblies 120 and connecting attachment assemblies 120 to slosh baffles 110 and to composite walls 104 inside composite tank 100.

In some examples, fitting fastener 159 is a threaded rod, attached to or integral to first fitting 140. For example, fitting fastener 159 can be welded to first fitting 140. A nut is threadedly coupled to fitting fastener 159, forcing second fitting 150 against first fitting 140.

Referring generally to FIG. 1 and particularly to, e.g., FIG. 4B for illustrative purposes only and not by way of limitation, the following portion of this paragraph delineates example 22 of the subject matter, disclosed herein. According to example 22, which encompasses any one of examples 2 to 21, above each of slosh baffles 110 comprises petal 111 and stiffener 114. Stiffener 114 comprises base 118, in contact with petal 111, and rib 115, extending from base 118 along central axis 106. Second fitting 150 is in contact with base 118 of stiffener 114 and is coupled to base 118 and to petal 111.

Stiffener 114 reinforces and attaches the corresponding one of slosh baffles 110 to second fitting 150. In particular, rib 115 provides an out-of-plate stiffness, e.g., in the direction, parallel to central axis 106. Base 118 is used for attachment to second fitting 150. As such, slosh baffles 110 can be formed as thin structures, helping with the overall weight savings in composite tank 100.

In some examples, base 118 extends between second fitting 150 and petal 111. Alternatively, petal 111 extends between base 118 and second fitting 150.

Referring generally to FIG. 1 and particularly to, e.g., FIG. 4B for illustrative purposes only and not by way of limitation, the following portion of this paragraph delineates example 23 of the subject matter, disclosed herein. According to example 23, which encompasses example 22, above, each of slosh baffles 110 comprises second stiffener 113. Second stiffener 113 comprises second-stiffener base 116 and second-stiffener rib 117, extending from second-stiffener base 116 along central axis 106. A portion of petal 111 is sandwiched between base 118 of stiffener 114 and second-stiffener base 116.

Second stiffener 113 further reinforces the corresponding one of slosh baffles 110, together with stiffener 114. Second-stiffener rib 117 provides additional out-of-plate stiffness, together with rib 115 of stiffener 114, e.g., in the direction, parallel to central axis 106. Furthermore, sandwiching the portion of petal 111 between base 118 of stiffener 114 and second-stiffener base 116 provides double-sided continuous support to petal 111 along the circumference of cylindrical interior surface 105 of composite wall 104.

In some examples, the width of second stiffener 113 is substantially the same as the width of stiffener 114. Specifically, second stiffener 113 and stiffener 114 form an aligned stack.

Referring generally to FIG. 1 and particularly to, e.g., FIGS. 4A and 4F for illustrative purposes only and not by way of limitation, the following portion of this paragraph delineates example 24 of the subject matter, disclosed herein. According to example 24, which encompasses any one of examples 1 to 21, above, each of slosh baffles 110 comprises petal 111, second petal 112, and petal connector 119, overlapping a portion of petal 111 and a portion of second petal 112 and interconnecting petal 111 and second petal 112.

Multiple petals, such as petal 111 and second petal 112, enable assembling slosh baffles 110 inside composite tank 100. Specifically, all components needed for this assembly can be fed through a small opening in composite tank 100.

Petal connector 119 interconnects petal 111 and second petal 112 and ensures the continuity of the corresponding one of slosh baffles 110 along the circumference of cylindrical interior surface 105 of composite wall 104.

In some examples, each of slosh baffles 110 comprises between 2 and 20 petals or, more specifically, between 5 and 10 petals. A smaller number of petals reduces the number of petal connectors, needed for interconnecting these petals. Once interconnected, these petals form a continuous ring adjacent to cylindrical interior surface 105 of composite wall 104.

Referring generally to FIG. 1 and particularly to, e.g., FIG. 4E for illustrative purposes only and not by way of limitation, the following portion of this paragraph delineates example 25 of the subject matter, disclosed herein. According to example 25, which encompasses any one of examples 1 to 24, above, composite tank 100 further comprises ground straps 190. Each of ground straps 190 is electrically coupled to a respective one of slosh baffles 110 and to composite wall 104.

Ground straps 190 provide direct electrical connections between slosh baffles 110 and composite wall 104. The conductive path through mechanical connections, e.g., provided by attachment assemblies 120, can be insufficient due to the materials used for various components of attachment assemblies 120. Furthermore, ground straps 190 enable controlling the electrical contact interface between slosh baffles 110 and composite wall 104.

In some examples, each of ground straps 190 is formed by a flexible metal sheet, having a sufficient cross-sectional profile. The width of each of ground straps 190 can be at least 5 times greater than the thickness or even at least 10 times greater to ensure the flexibility of ground straps 190. For example, the ends of ground straps 190 are movable relative to each other together with the movement of each of slosh baffles 110 relative to cylindrical interior surface 105.

Referring generally to FIG. 1 and particularly to, e.g., FIG. 4E for illustrative purposes only and not by way of limitation, the following portion of this paragraph delineates example 26 of the subject matter, disclosed herein. According to example 26, which encompasses any one of examples 1 to 25, above, slosh baffles 110 are evenly spaced from one another along central axis 106.

Even spacing slosh baffles 110 along central axis 106 enables the uniform control of propellant, sloshing along central axis 106. Furthermore, this even spacing also ensures the even distribution of the load (from the propellant sloshing) among slosh baffles 110 and to composite wall 104.

In some examples, the distance between two adjacent slosh baffles 110 is between about 2% and 20% of the overall distance between first end 102 and second end 103 of composite wall 104 or, more specifically, between about 5% and 10%.

Referring generally to FIG. 1 and particularly to, e.g., FIGS. 6, 7A-7G, 8A-8D, 9A, and 9B for illustrative purposes only and not by way of limitation, the following portion of this paragraph delineates example 27 of the subject matter, disclosed herein. According to example 27, which encompasses example 2, above, method 600 of fabricating composite tank 100 comprises a step of (block 610) positioning first circumferential bars 710 along cylindrical interior surface 105 of composite wall 104 proximate first end 102 of composite wall 104 in a predetermined orientation relative to central axis 106. First circumferential bars 710 are curved. Method 600 also comprises a step of (block 620) positioning second circumferential bars 711 along cylindrical interior surface 105 of composite wall 104 proximate second end 103 of composite wall 104 in a predetermined orientation relative to central axis 106. Second circumferential bars 711 are curved. Method 600 additionally comprises a step of (block 630) temporarily attaching first circumferential bars 710 and second circumferential bars 711 to cylindrical interior surface 105 of composite wall 104. Method 600 further comprises a step of (block 640) connecting axial bars 720 to first circumferential bars 710 and to second circumferential bars 711. Axial bars 720 comprise straight portions, parallel to central axis 106 of composite wall 104 and perpendicular to first circumferential bars 710 and to second circumferential bars 711. Method 600 also comprises a step of (block 650) positioning third circumferential bars 712 between first circumferential bars 710 and second circumferential bars 711 along cylindrical interior surface 105 of composite wall 104 using axial bars 720, such that third circumferential bars 712 are perpendicular to axial bars 720. Method 600 additionally comprises a step of (block 655) temporarily attaching third circumferential bars 712 to cylindrical interior surface 105 of composite wall 104. Method 600 further comprises a step of (block 660) detaching axial bars 720 from cylindrical interior surface 105 of composite wall 104. Method 600 also comprises a step of (block 665) locating stud-carriers 730 relative to cylindrical interior surface 105 of composite wall 104 using first circumferential bars 710, second circumferential bars 711, and third circumferential bars 712. Each of stud-carriers 730 supports four of stud assemblies 130. With stud assemblies 130 supported by stud-carriers 730 and located relative to cylindrical interior surface 105 of composite wall 104, method 600 then proceeds with (block 670) attaching stud assemblies 130 to cylindrical interior surface 105 of composite wall 104. Method 600 further comprises a step of (block 675) detaching first circumferential bars 710, second circumferential bars 711, and third circumferential bars 712 from cylindrical interior surface 105 of composite wall 104. Method 600 additionally comprises a step of (block 680) attaching slosh baffles 110 to stud assemblies 130 using a first plurality of fittings, comprising first fitting 140, and a second plurality of fittings, comprising second fitting 150.

Method 600 enables installation of slosh baffles 110 after forming composite wall 104 of composite tank 100. Specifically, composite wall 104 comprises a small opening, through which various components of slosh baffles 110 are fed through installation. As such, composite wall 104 can be formed in a more efficient manner (e.g., with fewer operations) and without a need for joining different parts of composite wall 104. In some examples, composite wall 104 is monolithic, which helps with the structural integrity and weight saving of composite tank 100.

When first circumferential bars 710 is positioned along cylindrical interior surface 105 of composite wall 104, first end 102 of composite wall 104 is used as a reference, e.g., for aligning purposes. First end 102 provides a simpler reference than, for example, cylindrical interior surface 105. Similarly, when second circumferential bars 711 is positioned along cylindrical interior surface 105 of composite wall 104, second end 103 of composite wall 104 is used as a reference. Thereafter, first circumferential bars 710 and second circumferential bars 711 are used as references for other components, such as axial bars 720. It should be noted that first circumferential bars 710 and second circumferential bars 711 are temporarily attached to cylindrical interior surface 105 of composite wall 104 and are removed during later operations. First circumferential bars 710 and second circumferential bars 711 are not parts of composite tank 100 but are tools for fabricating composite tank 100.

One or more additional circumferential bars, such as third circumferential bars 712, are positioned between first circumferential bars 710 and second circumferential bars 711, using axial bars 720 as reference. In some examples, additional circumferential bars are used, such as fourth circumferential bars 713, fifth circumferential bars 714, and sixth circumferential bars 715. Each set of circumferential bars corresponds to one of slosh baffles 110, later attached to cylindrical interior surface 105 of composite wall 104. For example, all of first circumferential bars 710 are used for positioning one of slosh baffles 110, while all of second circumferential bars 711 are used for positioning another one of slosh baffles 110. As such, the number of these circumferential sets determines the number of slosh baffles 110 in composite tank 100. It should be noted that axial bars 720 are used for aligning additional circumferential bars, such as third circumferential bars 712, relative to first circumferential bars 710 and second circumferential bars 711. However, axial bars 720 are not used directly for aligning any components of composite tank 100.

Stud-carriers 730, which support and align stud assemblies 130, are aligned relative to cylindrical interior surface 105 of composite wall 104 using first circumferential bars 710, second circumferential bars 711, and third circumferential bars 712. In these aligned stages, stud assemblies 130 are attached to cylindrical interior surface 105 of composite wall 104. This alignment determines the position of each one of slosh baffles 110 in composite tank 100.

After stud assemblies 130 are attached to cylindrical interior surface 105, first circumferential bars 710, second circumferential bars 711, and third circumferential bars 712 are detached from cylindrical interior surface 105 of composite wall 104 and removed from inside composite tank 100. Method 600 counties with attaching slosh baffles 110 to stud assemblies 130.

Figure 11:
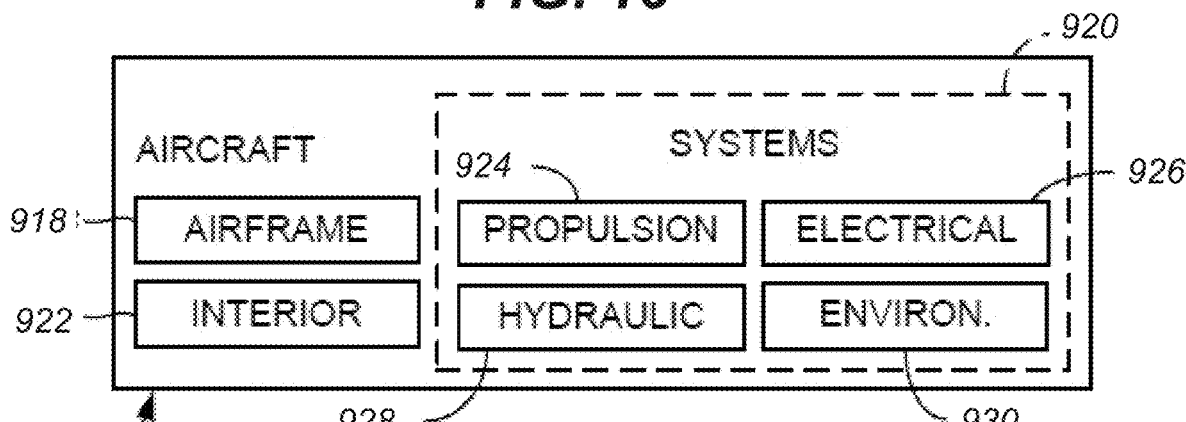
FIG. 11 is a schematic illustration of an aircraft.

Examples of the subject matter, disclosed herein may be described in the context of aircraft manufacturing and service method 900 as shown in FIG. 10 and aircraft 902 as shown in FIG. 11. During pre-production, method 900 may include specification and design (block 904) of aircraft 902 and material procurement (shown as block 906). During production, component and subassembly manufacturing (shown as block 908) and system integration (shown as block 910) of aircraft 902 may take place. Thereafter, aircraft 902 may go through certification and delivery (shown as block 912) to be placed in service (shown as block 914). While in service, aircraft 902 may be scheduled for routine maintenance and service (shown as block 916). Routine maintenance and service may include modification, reconfiguration, refurbishment, etc. of one or more systems of aircraft 902.

Each of the processes of method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 902 produced by method 900 may include airframe 918 with a plurality of high-level systems 920 and interior 922. Examples of high-level systems 920 include one or more of propulsion system 924, electrical system 926, hydraulic system 928, and environmental system 930. Any number of other systems may be included. Although an aerospace example is shown, the principles disclosed herein may be applied to other industries, such as the automotive industry. Accordingly, in addition to aircraft 902, the principles disclosed herein may apply to other vehicles, e.g., land vehicles, marine vehicles, space vehicles, etc.

Apparatus(es) and method(s) shown or described herein may be employed during any one or more of the stages of method 900. For example, components or subassemblies corresponding to component and subassembly manufacturing (block 908) may be fabricated or manufactured in a manner similar to components or subassemblies produced while aircraft 902 is in service (block 914). Also, one or more examples of the apparatus(es), method(s), or a combination thereof may be utilized during production stages, illustrated by block 908 and block 910, for example, by substantially expediting assembly of or reducing the cost of aircraft 902. Similarly, one or more examples of the apparatus or method realizations, or a combination thereof, may be utilized, for example, and without limitation, while aircraft 902 is in service (block 914) and/or during maintenance and service (block 916).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A composite tank for a reusable launch vehicle, the composite tank comprising:
 a composite wall, having a first coefficient of thermal expansion, wherein the composite wall comprises:
  a first end;
  a second end;
  a central axis, which passes through the first end and through the second end; and
  a cylindrical interior surface;
 slosh baffles, formed from a second material, having a second coefficient of thermal expansion that is different from the first coefficient of thermal expansion,
 wherein:
  each of the slosh baffles is attached to the cylindrical interior surface of the composite wall,
  each of the slosh baffles is annular and is separated from the cylindrical interior surface of the composite wall by a radial gap, selected, in part, based on a difference between the first coefficient of thermal expansion and the second coefficient of thermal expansion, and attachment assemblies, coupling the slosh baffles to the cylindrical interior surface of the composite wall, and each comprising:

a fitting with a slot and a baffle fastener that is movable within such slot to enable movement between the slosh baffles and the cylindrical interior surface, which changes the radial gap therebetween; and ground straps, wherein each of the ground straps is electrically coupled to a respective one of the slosh baffles and to the composite wall.

2. A composite tank for a reusable launch vehicle, the composite tank comprising:

a composite wall, having a first coefficient of thermal expansion, wherein the composite wall comprises:
a first end;
a second end;
a central axis, which passes through the first end and through the second end; and
a cylindrical interior surface;

slosh baffles, formed from a second material, having a second coefficient of thermal expansion that is different from the first coefficient of thermal expansion, wherein:
each of the slosh baffles is attached to the cylindrical interior surface of the composite wall,
each of the slosh baffles is annular and is separated from the cylindrical interior surface of the composite wall by a radial gap, selected, in part, based on a difference between the first coefficient of thermal expansion and the second coefficient of thermal expansion, and
the radial gap is configured to change responsive to changes in temperature of the composite tank; and attachment assemblies, coupling the slosh baffles to the cylindrical interior surface of the composite wall, and each attachment assembly comprising:

stud assemblies, each bonded to the cylindrical interior surface of the composite wall;
a first fitting, attached to the stud assemblies; and
a second fitting, attached to the first fitting and comprising a second-fitting slot, extending radially relative to the cylindrical interior surface of the composite wall.

3. The composite tank according to claim 2, further comprising a baffle fastener, protruding through the second-fitting slot and coupling the second fitting to a corresponding one of the slosh baffles.

4. The composite tank according to claim 2, wherein:
a subset of the attachment assemblies couple a single one of the slosh baffles to the cylindrical interior surface of the composite wall; and
the subset of the attachment assemblies are evenly circumferentially spaced relative to one another along the cylindrical interior surface of the composite wall.

5. The composite tank according to claim 4, wherein the subset of the attachment assemblies comprises at least three of the attachment assemblies.

6. The composite tank according to claim 2, wherein each of the stud assemblies comprises a metallic base and a composite base, which overlaps at least a portion of the metallic base.

7. The composite tank according to claim 6, wherein each of the stud assemblies further comprises a threaded rod, extending from the metallic base through the composite base and through the first fitting.

8. The composite tank according to claim 7, wherein each of the stud assemblies further comprises a nut, threaded onto the threaded rod such the nut biases the first fitting against the composite base of each of the stud assemblies.

9. The composite tank according to claim 6, wherein the metallic base of each of the stud assemblies is formed from a nickel-iron alloy.

10. The composite tank according to claim 6, wherein the metallic base and the composite base collectively form a wall-facing surface of each of the stud assemblies and the wall-facing surface is adhesively coupled to the cylindrical interior surface of the composite wall.

11. The composite tank according to claim 2, wherein:
the first fitting comprises a center portion and two arms, extending from the center portion in opposite directions along a first axis;
the center portion is attached to the second fitting; and
each of the two arms is attached to a respective one of the stud assemblies.

12. The composite tank according to claim 11, wherein:
each of the two arms of the first fitting comprises a slot, and
a portion of a respective one of the stud assemblies protrudes through the slot.

13. The composite tank according to claim 11, wherein:
the first fitting further comprises two additional arms, extending from the center portion, in opposite directions, along a second axis, perpendicular to the first axis,
each of the two additional arms is attached to a respective one of the stud assemblies.

14. The composite tank according to claim 2, wherein each one of the attachment assemblies further comprises a fitting fastener that interconnects the first fitting and the second fitting.

15. The composite tank according to claim 14, wherein the fitting fastener protrudes through the first fitting and through the second fitting.

16. The composite tank according to claim 2, wherein:
each of the slosh baffles comprises a petal and a stiffener; and
the stiffener comprises a base, in contact with the petal, and a rib, extending from the base along the central axis; and
the second fitting is in contact with the base of the stiffener and is coupled to the base and to the petal.

17. The composite tank according to claim 16, wherein:
each of the slosh baffles comprises a second stiffener,
the second stiffener comprises a second-stiffener base and a second-stiffener rib, extending from the second-stiffener base along the central axis, and
a portion of the petal is sandwiched between the base of the stiffener and the second-stiffener base.

18. The composite tank according to claim 2, wherein each of the slosh baffles comprises a petal, a second petal, and a petal connector, overlapping a portion of the petal and a portion of the second petal and interconnecting the petal and the second petal.

19. The composite tank according to claim 2, wherein the slosh baffles are evenly spaced from one another along the central axis.

20. The composite tank according to claim 2, wherein:
the attachment assemblies are evenly circumferentially spaced relative to one another along the cylindrical interior surface of the composite wall.

* * * * *